(12) United States Patent
Tokuhara

(10) Patent No.: US 7,475,750 B2
(45) Date of Patent: Jan. 13, 2009

(54) TRACTOR

(75) Inventor: Takayuki Tokuhara, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 351 days.

(21) Appl. No.: 10/567,937

(22) PCT Filed: Aug. 10, 2004

(86) PCT No.: PCT/JP2004/011460

§ 371 (c)(1),
(2), (4) Date: Aug. 10, 2006

(87) PCT Pub. No.: WO2005/014373

PCT Pub. Date: Feb. 17, 2005

(65) Prior Publication Data

US 2006/0289222 A1    Dec. 28, 2006

(30) Foreign Application Priority Data

| Aug. 12, 2003 | (JP) | 2003-292326 |
| Aug. 12, 2003 | (JP) | 2003-292327 |
| Aug. 12, 2003 | (JP) | 2003-292328 |
| Aug. 12, 2003 | (JP) | 2003-292329 |

(51) Int. Cl.
  *B60J 7/00* (2006.01)
(52) U.S. Cl. ............ 180/69.2; 180/69.24; 180/69.21; 180/69.22; 180/69.23; 180/89.17; 180/756; 296/183; 296/194
(58) Field of Classification Search ............ 180/69.2, 180/69.24, 69.21, 69.22, 69.23, 89.17, 756; 296/183, 194
  See application file for complete search history.

(56) References Cited

U.S. PATENT DOCUMENTS

| 6,030,029 A * | 2/2000 | Tsuda et al. ............ 296/203.02 |
| 6,517,111 B2 * | 2/2003 | Mizuta ...................... 280/756 |
| 6,837,326 B2 * | 1/2005 | Haun et al. ................ 180/68.6 |

FOREIGN PATENT DOCUMENTS

| DE | 102 05 640 | 8/2003 |
| JP | 8-142917 | 1/1996 |
| JP | HEI 11 105740 | 4/1999 |
| JP | 2003-48571 | 2/2003 |

* cited by examiner

*Primary Examiner*—Christopher Ellis
*Assistant Examiner*—Cynthia F. Collado
(74) *Attorney, Agent, or Firm*—Jordan and Hamburg LLP

(57) ABSTRACT

A tractor realizes the remarkable reduction of time and efforts necessary for an assembling operation of a hood. Here, a hood is split into a fixed-side forming body which is fixed to the body frame and an open-and-close side forming body which can open/close an upper surface of the fixed-side forming body, and the fixed-side forming body is split into a left half forming member and a right half forming member. On the other hand, a connecting support body is formed on the front portion of the body frame in an upwardly raised state and, front-end abutting portions of left-and-right-side half forming members are connected and fixed to the connecting support body using a connecting body in a state that the front-end abutting portions are sandwiched between the connecting support body and the connecting body in the longitudinal direction.

3 Claims, 19 Drawing Sheets

TRACTOR

TECHNICAL FIELD

The present invention relates to a tractor.

BACKGROUND ART

Conventionally, as one mode of a tractor, there has been known a tractor, wherein a hood which covers a prime mover part is split into a fixed-side forming body which is fixed to a body frame and an open-and-close side forming body which can open/close an upper surface of the fixed-side forming body and, the fixed-side forming body is split into a front grill forming member and a pair of left and right side panel forming members, the front grill forming member and the side panel forming members are connected and fixed to a support frame which is vertically mounted on the body frame. (see Japanese Patent Laid-Open Hei11(1999)-105740, for example)

DISCLOSURE OF THE INVENTION

However, in the above-mentioned hood, the fixed-side forming body is split into three parts consisting of the front grille forming member and the pair of left and right side panel forming members and hence, there exists a drawback that the number of the parts is increased so that a manufacturing cost is pushed up and, at the same time, these parts must be individually fixed to the body frame and hence, an assembling operation takes time and efforts.

Accordingly, the present invention provides a tractor in which a prime mover part is mounted on a front portion of a body frame and the prime mover part is covered with a hood, wherein the hood is split into a fixed-side forming body which is fixed to the body frame and an open-and-close side forming body which can open/close an upper surface of the fixed-side forming body, and the fixed-side forming body is split into a left half forming member and a right half forming member. On the other hand, a connecting support body is formed on the front portion of the body frame in an upwardly raised state and, front-end abutting portions of left and right half forming members are connected and fixed to the connecting support body using a connecting body in a state that the front-end abutting portions are sandwiched between the connecting support body and the connecting body.

Further, the present invention is also characterized by following constitutions.

(1) Inwardly pulling surface portions are respectively formed on front end portions of the left and right half forming members, inwardly pulling guide surface portions are formed on left and right side peripheral portions of the connecting support body, the inwardly pulling surface portions of the left and right half forming members are guided in the inwardly pulling direction along both inwardly pulling guide surface portions thus allowing front-end abutting portions of both left and right half forming members to abut each other.

(2) A connecting bolt which is directed rearwardly from the connecting body is mounted on the connecting body in a projecting manner, the connecting bolt is inserted into a bolt insertion hole formed in the connecting support body, a fastening nut is threadedly engaged with a distal end portion of the connecting bolt, wherein due to the fastening manipulation of the fastening nut, the connecting body and the connecting support body are made to approach each other thus clamping the front end abutting portions of the left and right half forming members in the longitudinal direction. Further, by guiding the inwardly pulling surface portions of the left and right half forming members in the inwardly pulling direction along inwardly pulling guide surface portions which are formed on the left and right peripheral portions of the connecting support body, front-end abutting portions of both left and right half forming members are allowed to abut each other.

BEST MODE FOR CARRYING OUT THE INVENTION

Figure 1:
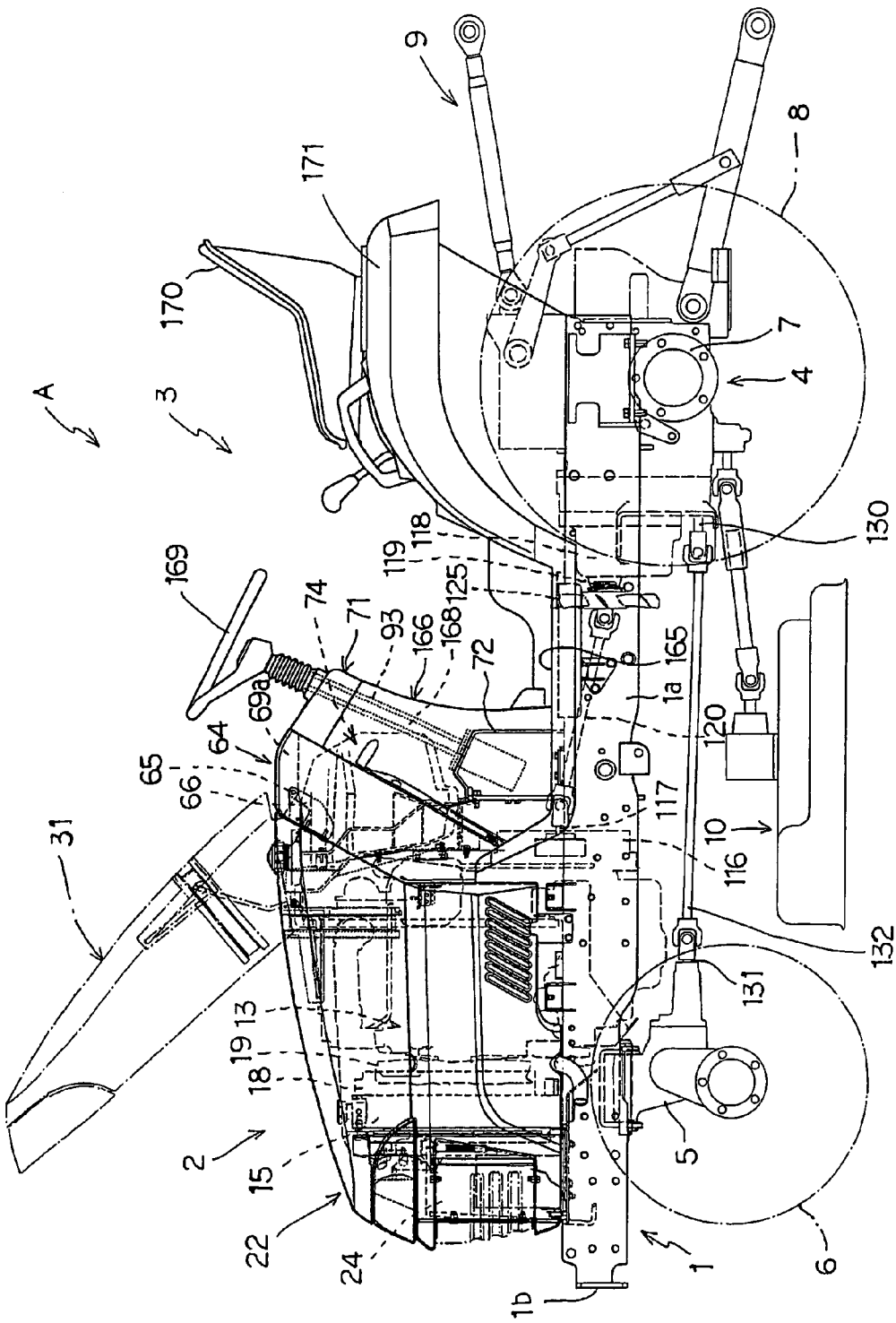
FIG. 1 is an explanatory side view of a tractor according to the present invention.

Symbol A shown in FIG. 1 indicates a tractor according to the present invention. The tractor A is configured as follows. Above the a body frame 1, a prime mover part 2 is arranged on a front portion of the body frame 1 and a driving portion 3 is arranged on a rear portion of the body frame 1, a transmission part 4 is arranged below a driver's seat 170 of the driving portion 3. Below the body frame 1, a pair of left and right front wheels 6, 6 are mounted on the front portion of the body frame 1 by way of a front axle case 5 and, at the same time, a pair of left and right rear wheels 8, 8 are mounted on the transmission part 4 by way of a rear axle case 7. Numeral 9 indicates an elevation link mechanism and numeral 10 indicates a mower.

The body frame 1 is, as shown in FIG. 1 to FIG. 5, formed of a pair of left and right longitudinally extending members 1a, 1a which extend in the longitudinal direction and a lateral extending member 1b which extends between front ends of both longitudinally extending members 1a, 1a in the lateral direction.

In the prime mover part 2, as shown in FIG. 1 to FIG. 5, an engine 13 is mounted between front portions of the pair of left and right longitudinally extending members 1a, 1a by way of engine mounts 11, 11, 12, 12, and a radiator 15 is arranged at a position right in front of the engine 13 by way of a radiator support body 14. On the other hand, a muffler 16 and an air cleaner 17 are arranged at a position right above the engine 13. Numeral 18 indicates a shroud, numeral 19 indicates a cooling fan and numeral 24 indicates a buttery.

Here, a cylinder head portion 20 is provided at a center upper portion of the engine 13. The muffler 16 is arranged at one side (in this embodiment, left side) of the cylinder head portion 20 and, the air cleaner 17 is arranged at the other side (in this embodiment, right side) of the cylinder head portion 20 in a state that the cylinder head portion 20 is sandwiched by the muffler 16 and the air cleaner 17. A proximal end portion 21a of an intake pipe 21 is connected to a right rear portion of the air cleaner 17 and the intake pipe 21 is arranged right above the cylinder head portion 20 in a state that the intake pipe 21 extends in the frontward direction.

Further, a front portion, left and right side portions and an upper portion of the above-mentioned prime mover part 2 are covered with a hood 22.

Due to such a constitution, right above the cylinder head portion 20, the intake pipe 21 is arranged in a state that the intake pipe 21 extends frontwardly than the air cleaner 17 and hence, it is possible to respectively arrange the muffler 16 and the air cleaner 17 in an outwardly spaced apart manner from the cylinder head portion 20 which is mounted on a center upper portion of the engine 13 and, at the same time, it is possible to arrange the muffler 16 and the air cleaner 17 as close as possible to the engine 13.

Figure 5:
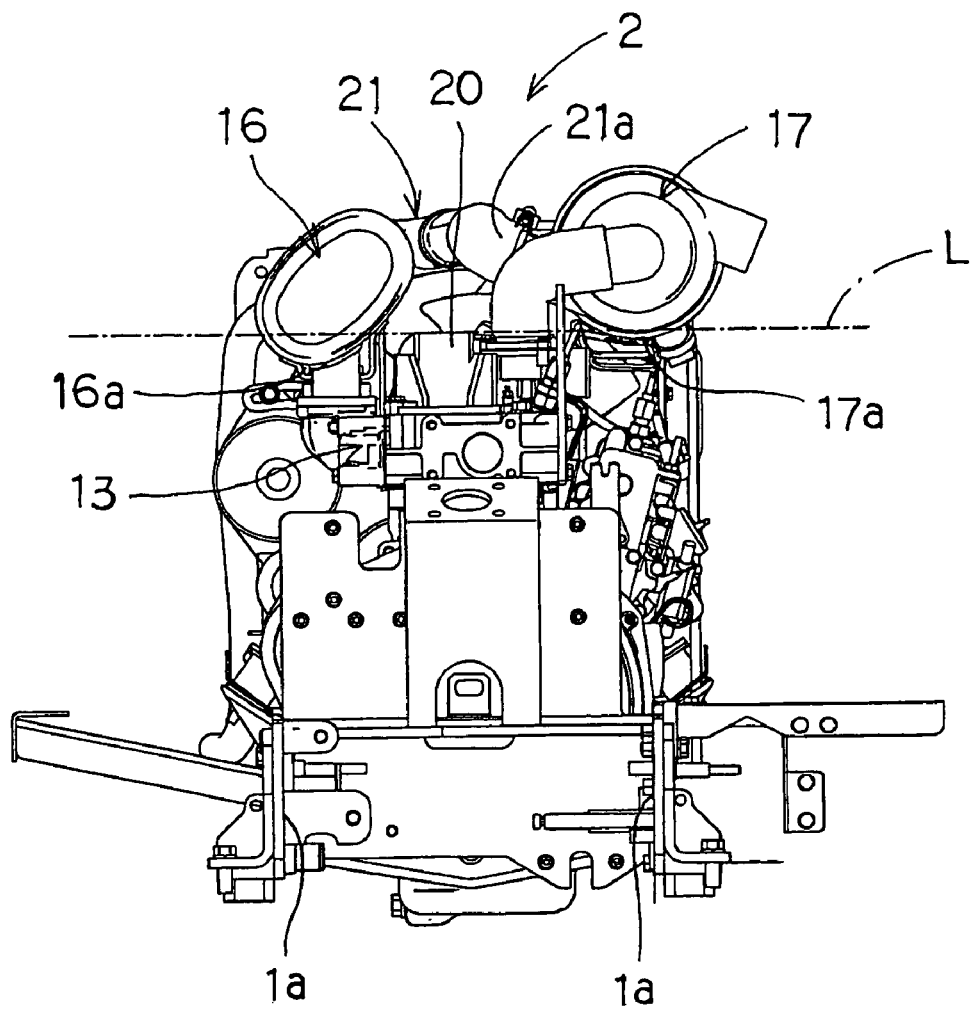
FIG. 5 is a back view of the prime mover part.

That is, lower end portions 16a, 17a of the muffler 16 and the air cleaner 17 are, as shown in FIG. 5, arranged below an upper end level L of the cylinder head portion 20 thus allowing the muffler 16 and air cleaner 17 to be arranged close to the engine 13 and, at the same time, the muffler 16 and the air cleaner 17 are arranged in the vicinity of the cylinder head portion 20.

As the result, a ceiling portion of the hood 22 which covers the muffler 16 and the air cleaner 17 from right above can be arranged at a low position which brings the ceiling portion as close as possible to the muffler 16 and the air cleaner 17 and hence, it is possible to make the hood 22 small sized and to reduce a manufacturing cost of the hood 22.

Figure 3:
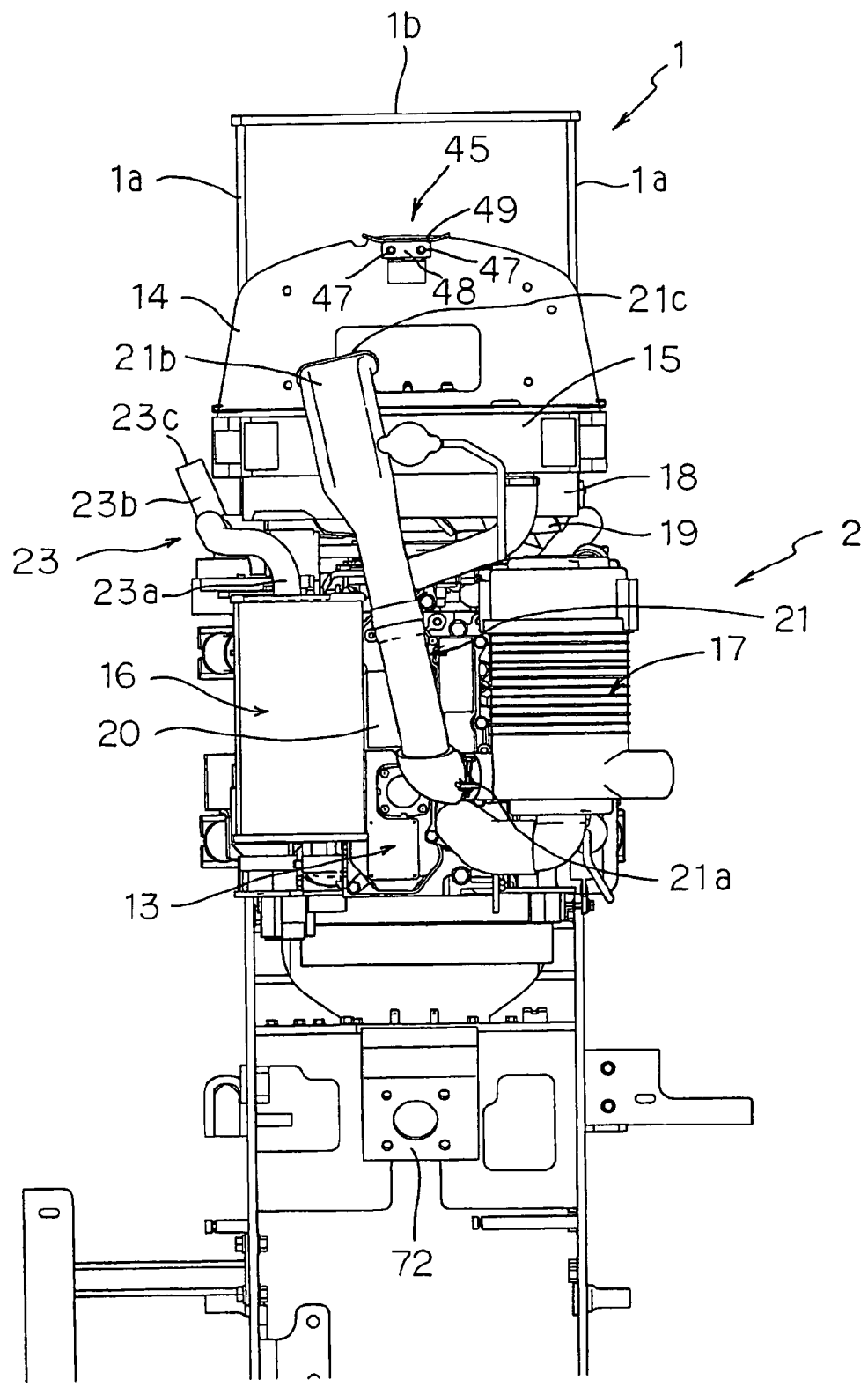
FIG. 3 is a plan view of the prime mover part.
Figure 4:
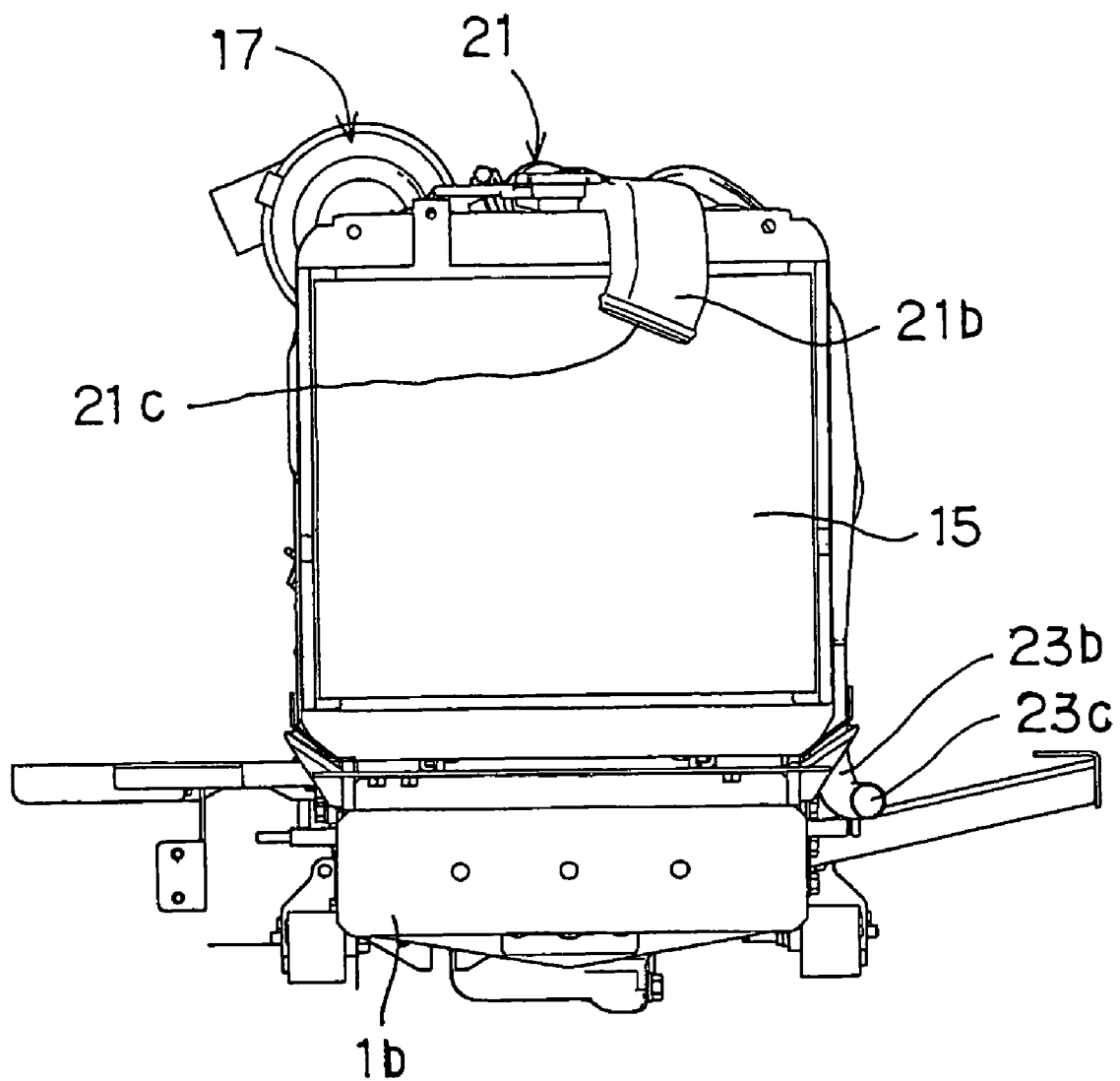
FIG. 4 is a front view of the prime mover part.

Further, the intake pipe 21, as shown in FIG. 3 and FIG. 4, has a distal end portion 21b thereof projected in the frontward direction from a left side portion of the radiator 15 which is arranged right in front of the engine 13, has the distal end portion 21b is extended in the downward direction, and has a distal end intake port 21c which is formed in the distal end portion 21b opened toward the right-side downward direction.

Figure 2:
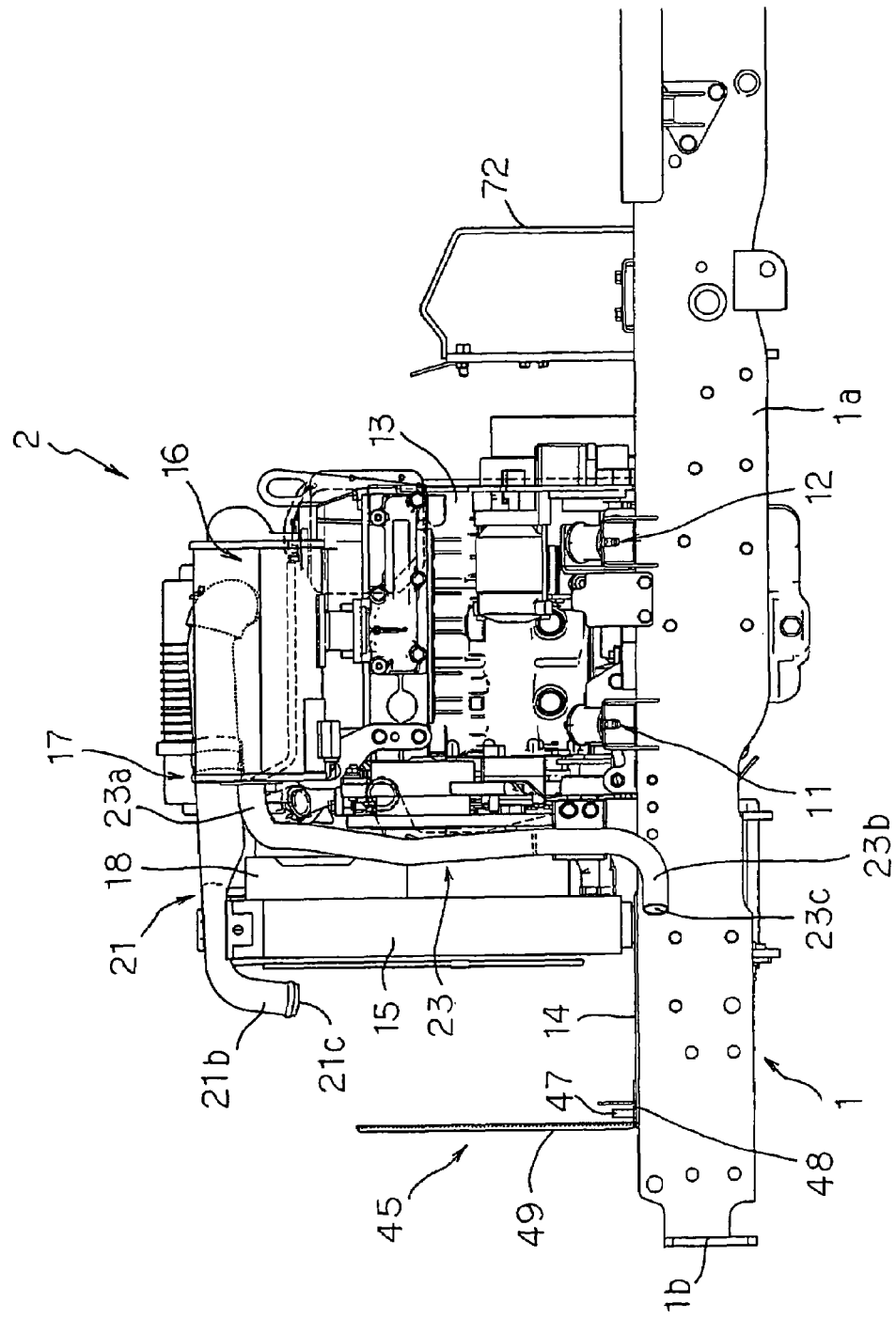
FIG. 2 is a side view of a prime mover part.

Here, as shown in FIG. 2 to FIG. 4, an exhaust pipe 23 has a proximal end portion 23a thereof connected to a front wall of the muffler 16, while the exhaust pipe 23 has a distal end potion 23b thereof extended in the downward direction and, then, extended to a left-side lower position of the radiator 15, and has a distal end exhaust port 23c is opened in the left-side outward direction of the hood 22.

Further, the distal end intake port 21c of the intake pipe 21 is opened in the right downward direction which is the direction away from the distal end exhaust port 23c of the exhaust pipe 23.

In this manner, the distal end intake port 21c of the intake pipe 21 is opened in the direction away from the distal end exhaust port 23c of the exhaust pipe 23 and hence, it is possible to prevent the occurrence of a drawback that an exhaust gas which is discharged from the distal end exhaust port 23c is sucked into the distal end intake port 21c.

The hood 22 is, as shown in FIG. 1 and FIG. 6 to FIG. 9, constituted of the two-split structure consisting of a fixed-side forming body 30 which is fixed to the body frame 1 and an open-and-close side forming body 31 which can open and close an upper surface of the fixed-side forming body 30, while the fixed-side forming body 30 is constituted of the two-split structure consisting of a left half forming member 32 and a right half forming member 33.

Further, each one of the left and right half forming members 32, 33 is constituted by integrally forming the left/right front-grill-portion forming member 34, 35 and left/right side-panel-portion forming member 36, 37. Each one of the left and right-side front grill forming member 34, 35 is constituted of upper and lower meshed body support frame members 34a, 34b, 35a, 35b, which are formed on upper and lower portions of a front end of each left/right side panel portion forming member 36, 37 in a state that the left/right side front grill-portion members 34, 35 extend frontwardly and bent inwardly, and a meshed body 38 which is extended between the both of upper and lower meshed body support frame members 34a, 34b, 35a, 35b.

Further, on end surfaces of the upper and lower meshed body support frame members 34a, 34b, 35a, 35b, front-end abutting portions 39, 40, 41, 42 are respectively formed. By allowing these front-end abutting portions 39, 40, 41, 42 to abut to each other in the lateral direction, it is possible to connect the upper and lower meshed body support frame members 34a, 34b, 35a, 35b.

Figure 9:
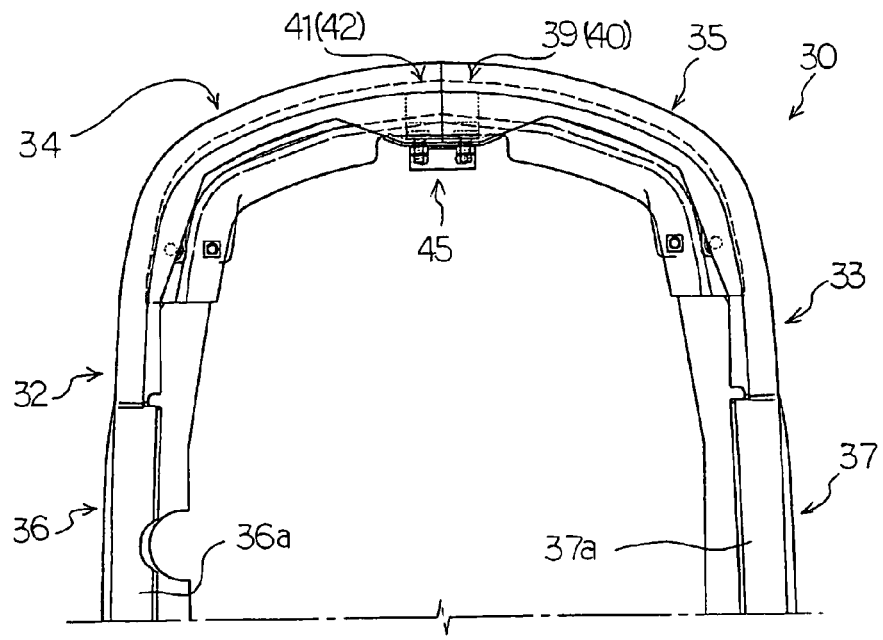
FIG. 9 is an explanatory plan view of the fixed-side-forming body.
Figure 9:
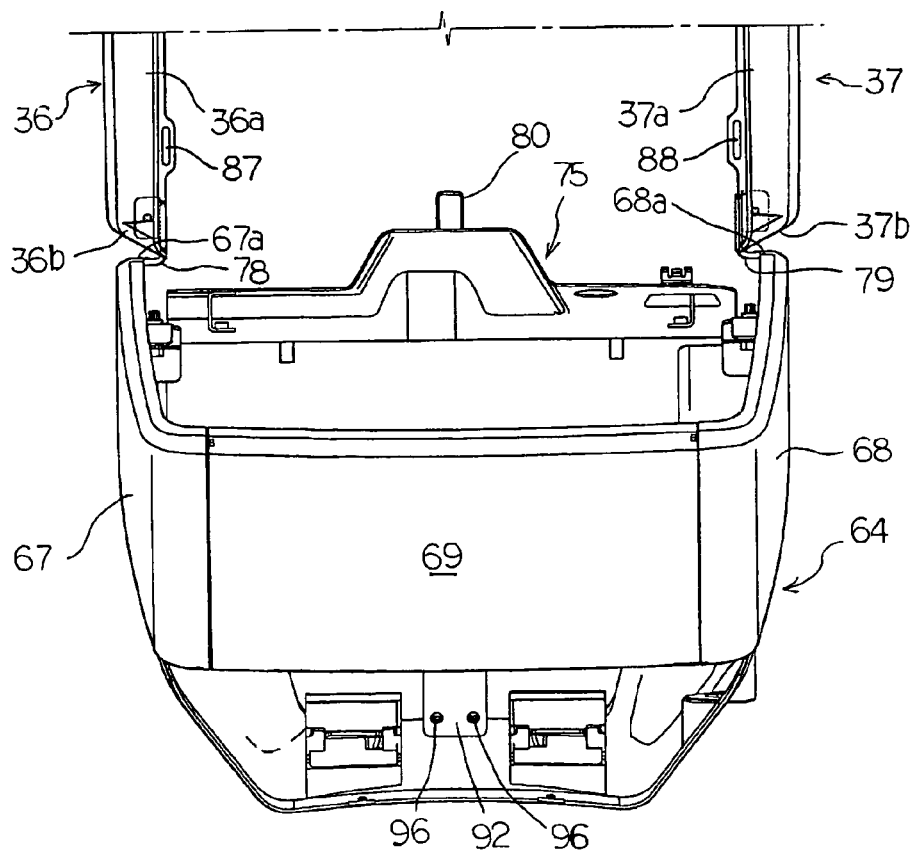
Figure 10:
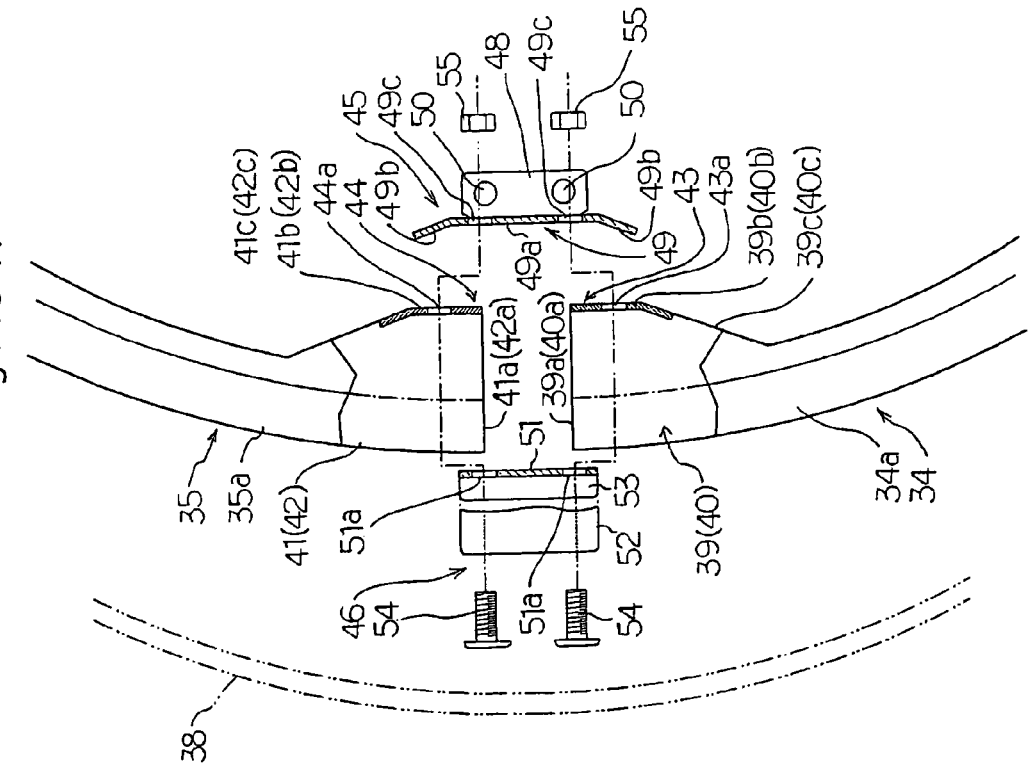
FIG. 10 is an explanatory view of an abutment of left and right half forming members.
Figure 10:
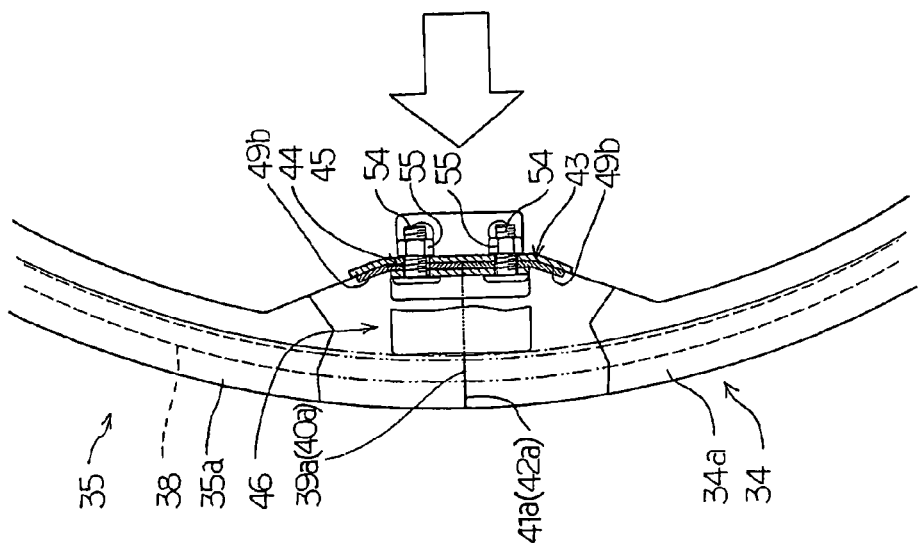

Here, on the front-end abutting portions 39, 40, 41, 42, as shown in FIG. 9 and FIG. 10 which are plan views, abutting flat-end-surface portions 39a, 40a, 41a, 42a which are arranged in the direction perpendicular to the lateral direction of the body, rear-end-surface portions 39b, 40b, 41b, 42b which are arranged in the direction perpendicular to the respective abutting flat-end-surface portions 39a, 40a, 41a, 42a, tapered inwardly pulling surface portions 39c, 40c, 41c, 42c which are directed frontwardly and outwardly from outer ends of the respective rear-end-surface portions 39b, 40b, 41b, 42b, and connecting members 43, 44 which extend in the vertical direction along inner portions of the inwardly pulling surface portions 39c, 40c, 41c, 42c and the respective rear end surface portions 39b, 40b, 41b, 42b are formed. Bolt insertion holes 43a, 43a, 44a, 44a are formed in an upper portion and a lower portion of each connecting member 43, 44.

Further, the front-end-abutting portions 39, 40, 41, 42 are, as shown in FIG. 7 to FIG. 10, connected and fixed to a connecting support body 45 which is formed in an upwardly raised manner from the body frame 1 using a connecting body 46 in a state that the front-end-abutting portions 39, 40, 41, 42 are sandwiched between the connecting support body 45 and the connecting body 46 in the longitudinal direction.

That is, the connecting support body 45 is, as also shown in FIG. 2 and FIG. 3, mounted in an erected manner on the front end portion of the radiator support body 14 which is arranged at a front portion of the body frame 1. The connecting support body 45 is constituted of a plate like fixing member 48 which is fixed to the radiator support body 14 using fixing pins 47, 47 and a connecting-support main member 49 which is formed in an upwardly erected manner on a front end portion of the fixing member 48. Numeral 50 indicates a pin insertion hole.

Further, on the connecting support main member 49, a connecting support surface portion 49a which includes a planer surface which is arranged in parallel to the lateral direction of the body and inwardly-pulling guide surface portions 49b, 49b each of which includes a tapered surface directed outwardly and frontwardly from lateral peripheral portions of the connecting support surface portion 49a. By guiding the inwardly pulling surface portions 39c, 40c, 41c, 42c of the front end abutting portions 39, 40, 41, 42 are guided in the inward direction along the inwardly pulling guide surface portions 49b, 49b, the abutting flat end surface portions 39a, 40a, 41a, 42a of both front end abutting portions 39, 40, 41, 42 are allowed to abut to each other.

Still further, in lateral upper and lower portions of the connecting support surface portion 49a, bolt insertion holes 49c, 49c, 49c, 49c which are longitudinally aligned with the bolt insertion holes 43a, 43a, 44a, 44a formed in the upper and lower portions of the respective connecting members 43, 44 are formed.

The connecting body 46 is, as shown in FIG. 7 to FIG. 10, formed in a U-shape as viewed in a side view and is constituted of a vertically longitudinal quadrangular plate-like connecting main member 51 having a lateral width substantially equal to a lateral width of the connecting support surface portion 49a of the connecting support main member 49, an upper alignment guide member 52 which extends frontwardly from an upper end peripheral portion of the connecting main member 51, and a lower alignment guide member 53 which extends frontwardly from a lower end peripheral portion of the connecting main member 51.

Further, in left and right-side upper and lower portions of the connecting main member 51, the above-mentioned bolt insertion holes 43a, 43a, 44a, 44a which are respectively formed in the upper and lower portions of the connecting members 43, 44 and bolt insertion holes 51a, 51a, 51a, 51a which are longitudinally aligned with the bolt insertion holes 49c, 49c, 49c, 49c formed in the left and right-side upper and lower portions of the connecting support surface portions 49a are formed.

Figure 8:
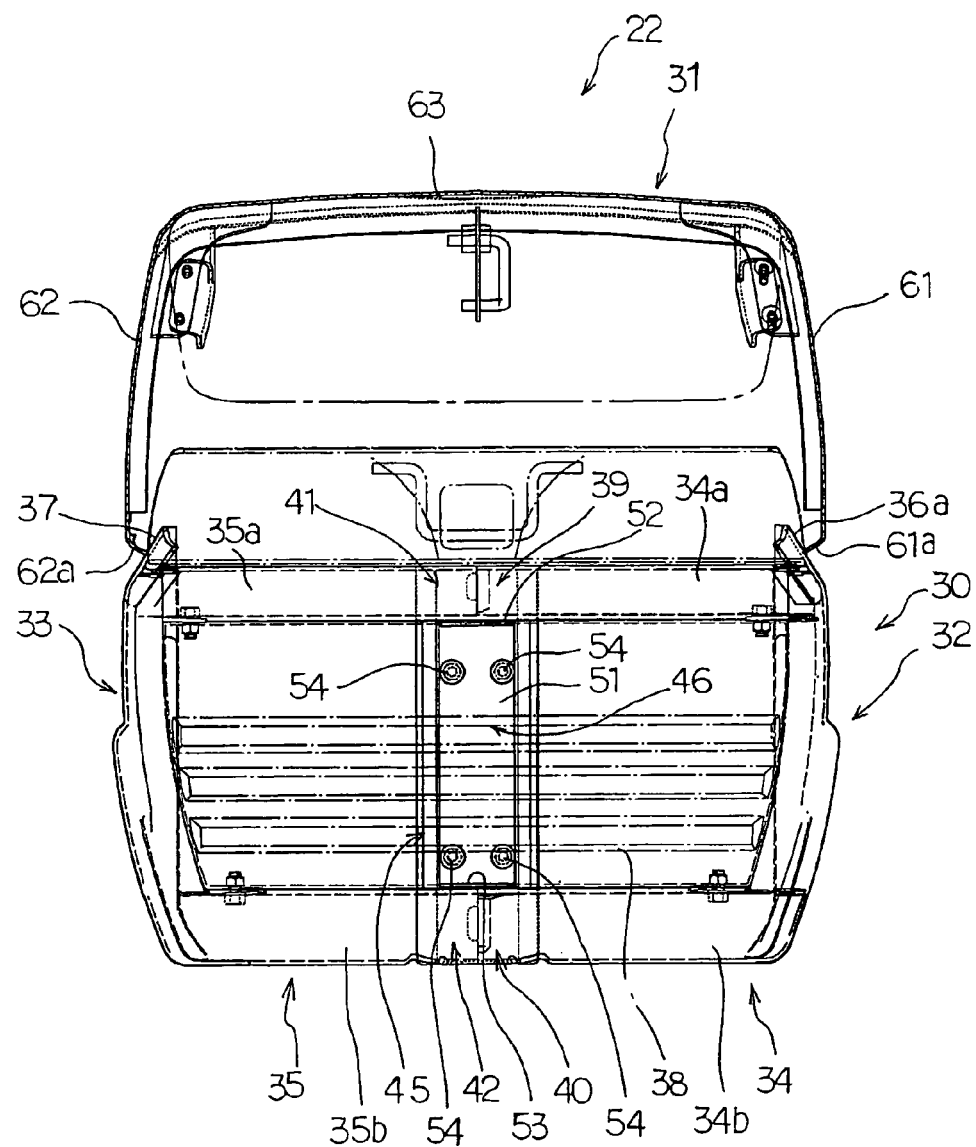
FIG. 8 is a front view with a part broken away of a hood.

Further, a vertical width of the connecting main member 51 is, as shown in FIG. 8, set to a value substantially equal to a vertical space of the upper and lower meshed body support frame members 34a, 34b, 35a, 35b. Due to such a constitution, the upper front end abutting portions 39, 41 are guided to be aligned with each other in the abutting direction due to an upper surface of an upper alignment guide member 52 which is formed in a state that the upper alignment guide member 52 extends frontwardly from an upper end peripheral portion of the connecting main member 51 and, at the same time, the lower front-end abutting portions 40, 42 are guided to be aligned with each other in the abutting direction due to a lower surface of a lower alignment guide member 53 which is formed in a state that the lower alignment guide member 53 extends frontwardly from a lower end peripheral portion of the connecting main member 51.

Due to such a constitution, as shown in FIG. 10(a), by allowing the bolt insertion holes 51a, 51a, 51a, 51a which are formed in the connecting main body 51, the bolt insertion holes 43a, 43a, 44a, 44a which are formed in the respective connecting members 43, 44 and the bolt insertion holes 49c, 49c, 49c, 49c which are formed in the connecting support surface portion 49a to be aligned with each other in the longitudinal direction, by inserting connecting bolts 54, 54, 54, 54 into these bolt insertion holes from a front side in such a state, and by threadedly mounting fastening nuts 55, 55, 55, 55 on distal end portions of the respective connecting bolts 54, 54, 54, 54, as shown in FIG. 10(b), it is possible to connect and fix the front-end abutting portions 39, 40, 41, 42 to the connecting support body 45 using the connecting body 46 in a state that the abutting portions 39, 40, 41, 42 are sandwiched in the longitudinal direction by the connecting support body 45 and the connecting body 46 and, at the same time, the abutting flat-end-surface portions 39a, 40a, 41a, 42 can be joined to each other.

Here, due to the fastening manipulation of the fastening nuts 55, 55, 55, 55, the connecting body 46 is allowed to approach the connecting support body 45 thus clamping the front-end abutting portions 39, 40, 41, 42 of the left and right half forming members 32, 33 in the longitudinal direction. Further, the inwardly pulling surface portions 39c, 40c, 41c, 42c of the front-end abutting portions 39, 40, 41, 42 are guided in the inwardly pulling direction along the inwardly pulling guide surface portions 49b, 49b which are respectively formed on left and right side peripheral portions of the connecting support main member 49 and hence, it is possible to allow the abutting flat-end-surface portions 39a, 40a, 41a, 42a to abut and to join to each other smoothly and surely thus enhancing the assembling accuracy.

Further, the upper surface of the upper portion alignment guide member 52 of the connecting main member 51 guides the upper front-end abutting portions 39, 41 for allowing the upper front-end abutting portions 39, 41 to be aligned with each other in the abutting direction and, at the same time, a lower surface of the lower portion alignment guide member 53 of the connecting main member 51 guides the lower front end abutting portions 40, 42 for allowing the lower front-end abutting portions 40, 42 to be aligned with each other in the abutting direction. Accordingly, also from this aspect, it is also possible to allow the abutting flat-end-surface portions 39a, 40a, 41a, 42a to abut and join to each other smoothly and surely thus enhancing the assembling accuracy.

Still further, in this embodiment, the fixed-side forming body 30 is split into the left half forming member 32 and right half forming member 33 and hence, it is possible to reduce the number of parts thus reducing the manufacturing cost of the tractor. Further, the front end abutting portions 39, 40, 41, 42 of the left and right half forming members 32, 33 are fixed to the connecting support body 45 which is formed on the front portion of the body frame 1 in an upwardly raised manner using the connecting body 46 in a state that the front end abutting portions 39, 40, 41, 42 are sandwiched by the connecting support body 45 and the connecting body 46 and hence, it is possible to largely reduce the time and efforts necessary for the assembling operation of the tractor.

Figure 11:
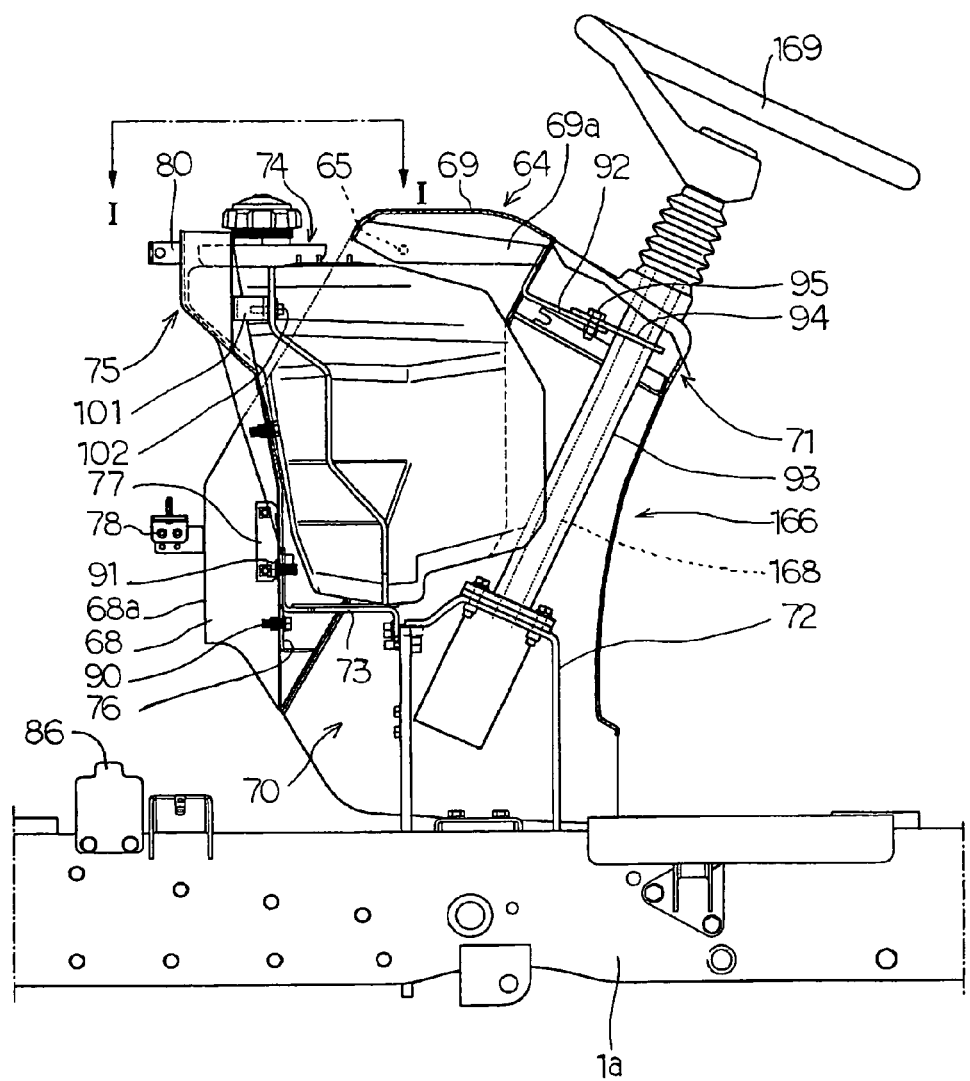
FIG. 11 is a side view with a part broken away of a dashboard stay.
Figure 12:
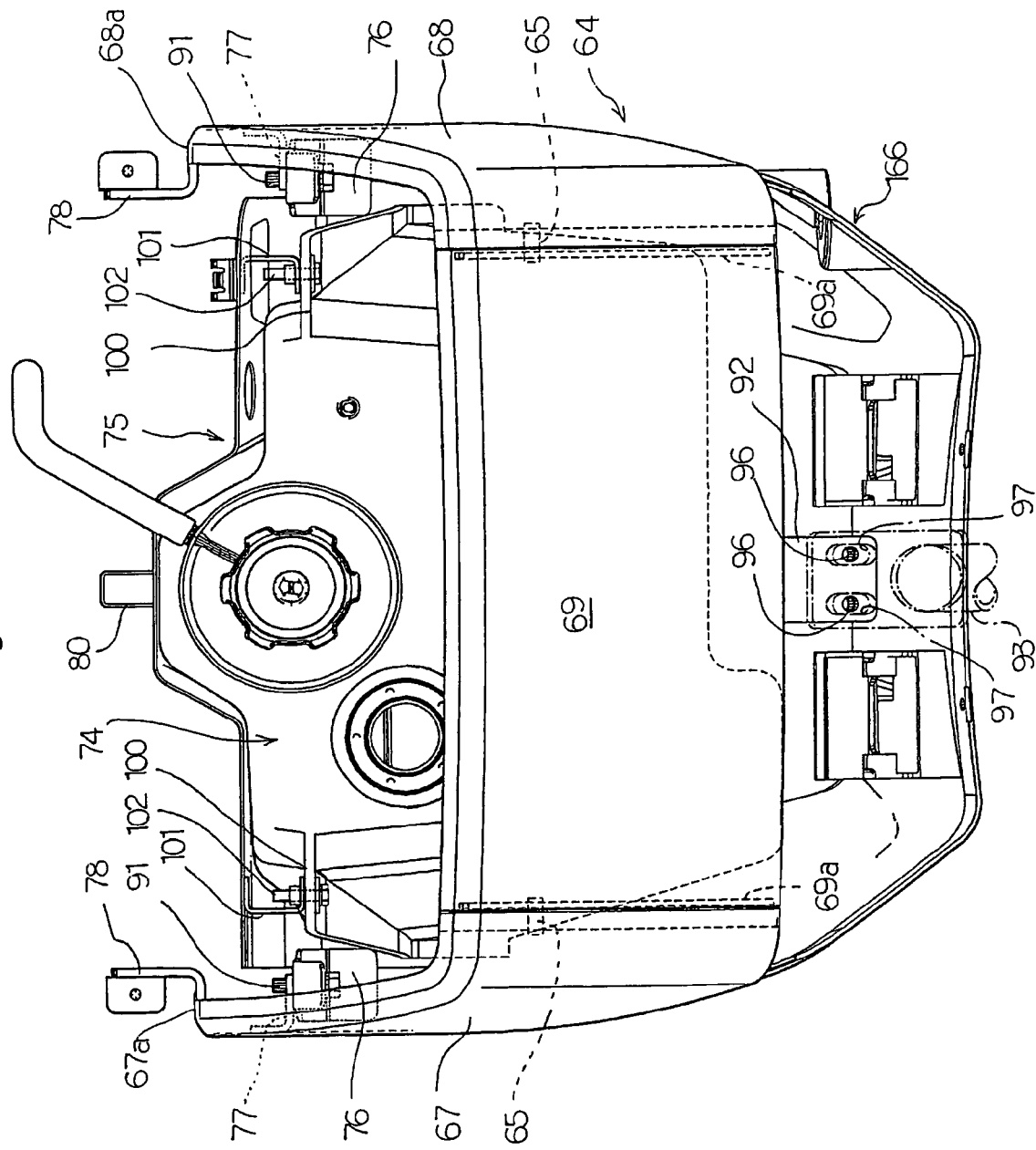
FIG. 12 is a view as viewed from a line I-I in FIG. 11.

Here, rear end portions of the left and right side panel portion forming members 36, 37 and a rear end portion of the open-and-close-side forming body 31 are, as shown in FIG. 9, FIG. 11 and FIG. 12, supported on a dashboard stay 64 which supports a dashboard 71 thereon. The dashboard stay 64 is formed in a gate shape as viewed in a front view and is constituted of a pair of left and right wall forming members 67, 68 which extend in the rearward and upward direction and a ceiling portion forming member 69 which is extended between upper end peripheral portions of both side wall forming members 67, 68.

Further, the dashboard stay 64 is, as shown in FIG. 11, mounted on a fuel tank support body 70 which is mounted in an erected manner on a middle portion of the body frame 1, while the dashboard 71 and a steering column 166 of the driving portion 3 described later are contiguously connected to a rear end peripheral portion of the dashboard stay 64.

The fuel tank support body 70 is, as shown in FIG. 11 and FIG. 12, constituted of a steering-post support base 72 which is extended between middle portions of the pair of left and right longitudinally extending members 1a, 1a and a support frame 73 which is extended frontwardly and horizontally from an upper portion of a front wall of the steering post support base 72 and is also erected vertically. A fuel tank 74 is mounted on the support frame 73, a lower end portion of a partition wall body 75 is mounted on an upper end portion of the support frame 73 so that the fuel tank 74 which is arranged right in front of the engine 13 can be isolated from the engine 13 with the use of the partition wall body 70.

Further, on left and right peripheral portions of the partition wall body 75, dashboard stay connecting members 76, 76 which respectively extend in the vertical direction are mounted using mounting bolts 90, 90 in a state that the dashboard stay connecting members 76, 76 project outwardly. The side wall forming members 67, 68 of the dashboard stay 64 are connected to the dashboard stay connecting members 76, 76 by way of connecting bracket 77, 77 using connecting bolts 91, 91 which are threadedly mounted on a front side of the tractor.

Further, on a center portion of a rear end of the ceiling portion forming member 69 of the dashboard stay 64, a stay-side connecting bracket 92 having an L-shaped as viewed in a side view is mounted in a state that the bracket 92 projects rearwardly, while a post-side connecting bracket 94 is mounted on an upper portion of a steering post 93 which is mounted in an erected manner on the steering post support base 72 in a state that the post-side connecting bracket 94 projects frontwardly, and both connecting brackets 92, 94 are overlapped to each other and are connected to each other in the vertical direction using connecting bolts 95, 95 which are threadedly mounted from above.

Here, connecting bolt holes 96, 96 are formed in the stay-side connecting bracket 92, while connecting-bolt elongated holes 97, 97 which extend in the longitudinal direction are formed in the post-side connecting bracket 94. Both connecting bolt elongate holes 97, 97 are aligned with to the connecting bolt holes 96, 96 from above. Accordingly, after performing the positional adjustment, it is possible to connect the stay-side connecting bracket 92 and the post-side connecting bracket 94 using the connecting bolts 95, 95.

In this manner, without forming the dashboard stay 64 as the constituting member of the body frame 1 by directly mounting the dashboard stay 64 on the body frame 1, it is possible to mount the dashboard stay 64 on the partition wall body 75 and the steering post 93 later and hence, the degree of freedom in designing of parts in the inside of the dashboard stay 64 can be increased.

Further, the connecting bolts 91, 95 for mounting (assembling) the dashboard stay 64 are threadedly mounted from a front side or above and hence, it is possible to easily perform the connecting operation of the dashboard stay 64 using these connecting bolts 91, 95.

Here, the connecting bolt elongated holes 97, 97 which extend in the longitudinal direction are formed in the post-side connecting bracket 94 and hence, it is possible to perform the longitudinal positional adjustment of the dashboard stay 64 thus increasing the degree of freedom in mounting of the dashboard stay 64.

Further, since the dashboard stay 64 is not used as the constituting member of the body frame 1, it is sufficient for the dashboard stay 64 to maintain the strength necessary for supporting the open-and-close side forming body 31 whereby the dashboard stay 64 can be simplified.

Figure 6:
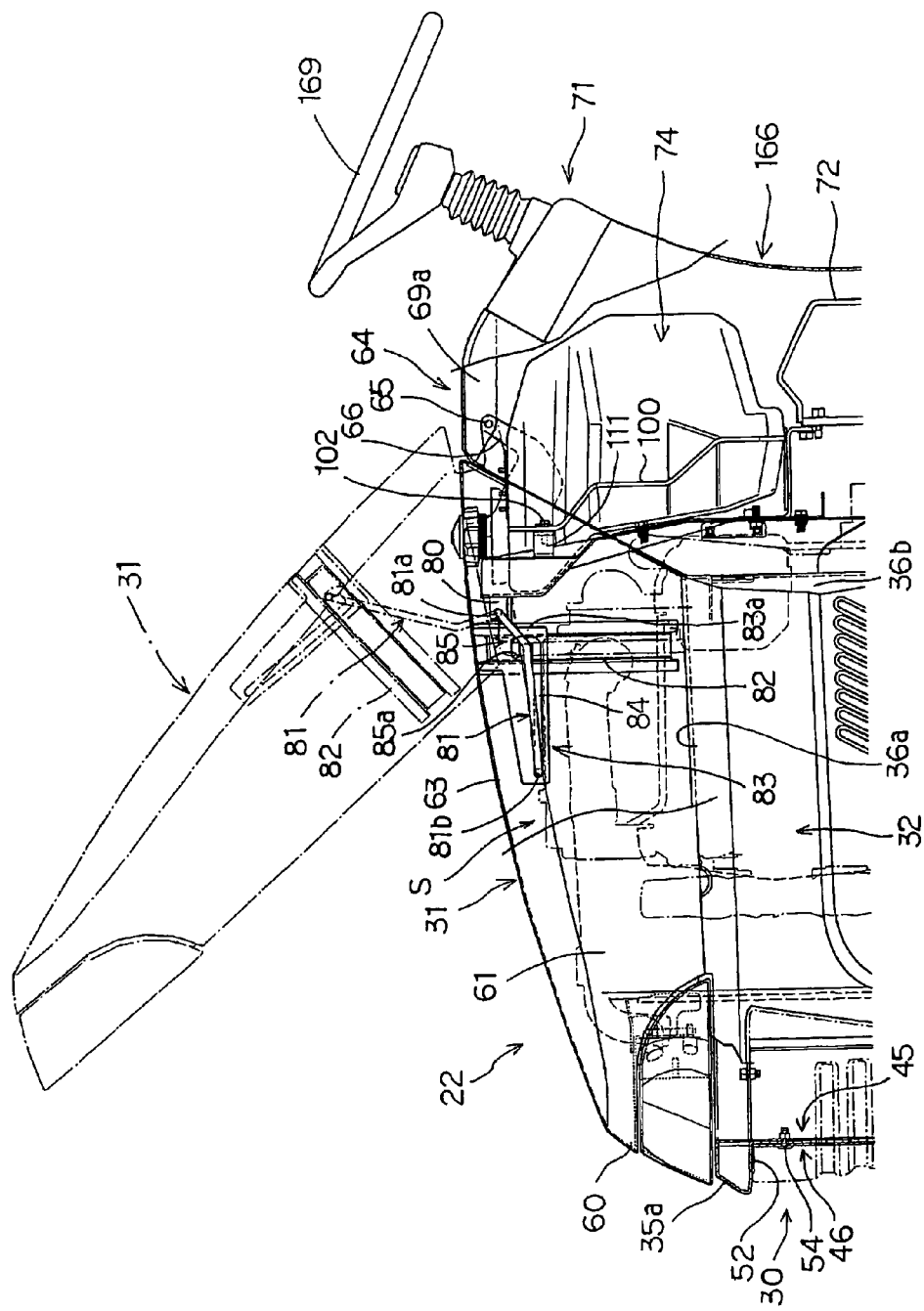
FIG. 6 is an explanatory side view of the prime mover part.

The open-and-close side forming body 31 is, as shown in FIG. 6 and FIG. 8, constituted of a front wall forming member 60, left and right-side wall forming members 61, 62 and a ceiling portion forming member 63. Proximal end portions of open-close support arms 66, 66 are pivotally supported on a pair of left and right pivotally supporting members 69a, 69a which are downwardly projected from left and right-side portions of an inner surface of the ceiling portion forming member 69 of the dashboard stay 64 by way of a pivotally support pin 65 which has an axis thereof directed in the lateral direction. Distal end portions of the respective open-close support arms 66, 66 are contiguously mounted on a rear portion of the ceiling portion forming member 63. The open-close-side forming body 31 is configured to be opened or closed in the vertical direction about the pivotally supporting pin 65.

Figure 7:
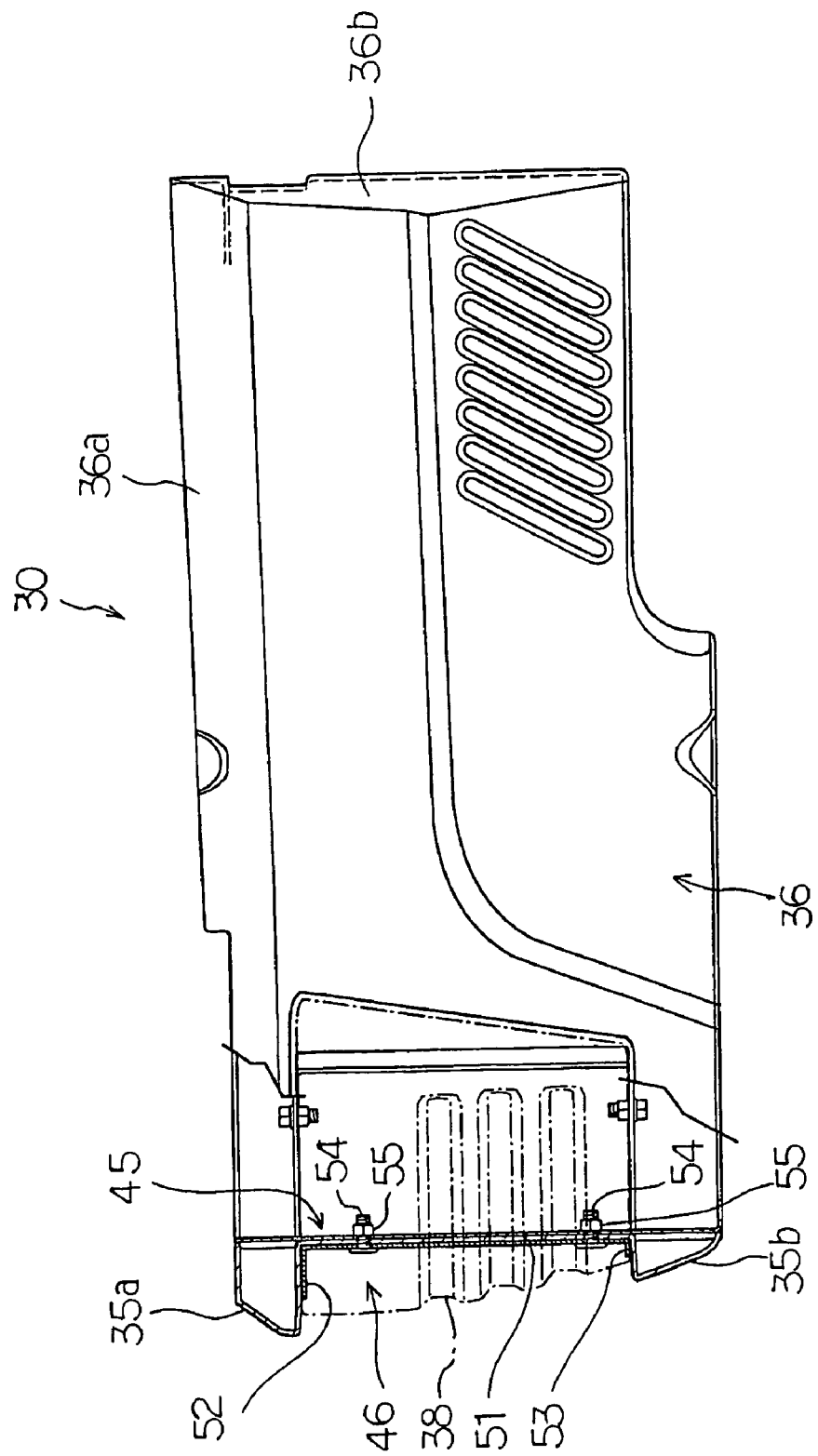
FIG. 7 is a side view with a part broken away of a fixed-side-forming member.

Further, on the left and right-side wall forming members 61, 62 of the open-and-close side forming body 31, as shown in FIG. 8 which is a cross-sectional front view, lower-end peripheral portions 61a, 62a are formed in a state that lower-end peripheral portions 61a, 62a are bent inwardly, while on upper end peripheral portions of the left and right side-panel-portion forming members 36, 37, as shown in FIG. 7 to FIG. 9, the abutting members 36a, 37a which are inclined inwardly and upwardly are formed along the upper end peripheral portions. In a state that the open-close-side forming body 31 is closed, in a side view, the respective lower end peripheral portions 61a, 62a are brought into contact with the above-mentioned respective abutting members 36a, 37a which are formed in an inwardly and upwardly inclined manner from above and, at the same time, the respective lower end peripheral portions 61a, 62a and the respective abutting members 36a, 37a are overlapped to each other on inner and outer sides.

In this manner, by allowing the abutting members 36a, 37a which are formed on the upper end peripheral portions of the left and right side-panel-portion forming members 36, 37 and the lower end peripheral portions 61a, 62a of the open-close-side forming bodies 31 in the closed state to be overlapped to each other on the inner and outer sides in a side view, the gap adjusting operation becomes no more necessary and hence, the assembling operation can be performed extremely easily and, at the same time, the efficiency of the assembling operation can be enhanced.

Further, it is possible to enhance the aesthetic appearance of the hood 22 can be enhanced thus increasing a product value.

Further, on rear end peripheral portions of the left and right side-panel-portion forming members 36, 37, as shown in FIG. 6 and FIG. 9, the abutting members 36a, 37a which are inclined inwardly and rearwardly are formed along the rear end peripheral portions, in a side view, the abutting members 36a, 37a and the lower front end peripheral portions 67a, 68a of the respective side wall forming members 67, 68 of the dashboard stay 64 are overlapped to each other on inner and outer sides.

In this manner, by allowing the abutting members 36a, 37a which are formed on the rear end peripheral portions of the left and right side-panel-portion forming members 36, 37 and the lower front-end peripheral portions 67a, 68a of the dashboard stay 64 to be overlapped to each other on the inner and outer sides in a side view, the gap adjusting operation becomes no more necessary and hence, the assembling operation can be performed extremely easily and, at the same time, the efficiency of the assembling operation can be enhanced.

Further, it is possible to enhance the aesthetic appearance of the hood 22 thus increasing a product value.

Further, on lower portions of the respective side wall forming members 67, 68 of the dashboard stay 64, connecting members 78, 79 are mounted in a state that the connecting members 78, 79 project frontwardly, and rear end portions of the left and right side-panel-portion forming members 36, 37 are connected to and supported on the lower portions of the respective side-wall forming members 67, 68 of the dashboard stay 64 by way of the respective connecting members 78, 79.

Further, as shown in FIG. 11, fit-in projecting members 86, 86 are mounted on middle portions of the pair of left and right longitudinally extending members 1a, 1a in a state that fit-in projecting members 86, 86 are directed upwardly, while as shown in FIG. 9, fit-in holes 87, 88 are formed in rear-end lower portions of the left and right side-panel-portion forming members 36, 37, the respective fit-in projecting members 86, 86 are fitted into the respective fit-in holes 87, 88 thus connecting and supporting the rear-end lower portions of the left and right side-panel-portion forming members 36, 37 to the longitudinal extending members 1a, 1a.

On an upper portion of the partition wall body 75, as shown in FIG. 6, a pivotally supporting member 80 is mounted in a state that the pivotally supporting member 80 extends frontwardly. A proximal end portion 81a of a rod-like opening support body 81 is pivotally supported on and connected to the supporting member 80, while reinforcing rib body 82 is mounted on a middle portion of an inner surface of the open-and-close side forming body 31 along the left and right sidewall forming members 61, 62 and the ceiling portion forming member 63, and a guide body 83 is formed on a center portion (a portion which is contiguously formed on a center portion of the ceiling portion forming member 63) of the reinforcing rib body 82.

Further, the guide body 83 is formed in a state that the guide body 83 extends frontwardly from a proximal end portion 83a thereof which is mounted on the reinforcing rib body 82 along the ceiling portion forming member 63, while a guide groove 84 which extends in the longitudinal direction is formed in the guide body 83. A distal end portion 81b of the opening support body 81 is connected to the guide body 83 by way of the guide groove 84 and, at the same time, the distal end portion 81b is arranged slidable along the guide groove 84.

Further, a semicircular curved groove 85 which curves in a convex shape rearwardly is continuously formed on a rear end portion of the guide groove 84. By allowing the distal end portion 81b of the opening support body 81 to be engaged with the distal end peripheral portion 85a of the curved groove 85, it is possible to maintain the open-and-close side forming body 31 in an upwardly opened state.

Here, by forming a plurality of engaging recessed portions (not shown in the drawing) which can be engaged with the distal end 81b of the opening support body 81 at predetermined positions of the guide groove 84 and by allowing the distal end portion 81b of the opening support body 81 to be engaged with the desired engaging recessed portion, it is possible to change an opening angle of the open-and-close side forming body 31 at several stages in response to operation conditions.

In this manner, since the opening support body 81 is interposed between the partition wall 75 which is supported on the body frame 1 and the guide body 83 which is formed on the inner surface of open-and-close side forming body 31, it is possible to prevent the vibrations from propagating to the opening support body 81 which forms a portion of the hood 22 from the engine 13 of the prime mover part 2 which constitutes a vibration source. As a result, it is possible to prevent the opening support body 81 from generating chattering noises which are offensive to the ear.

Further, the guide body 83 having the guide groove 84 which extends in the longitudinal direction is mounted on the inner surface of the ceiling portion forming member 63 of the open-and-close side forming body 31 and hence, it is possible to allow the distal end portion 81b of the opening support body 81 to slide along the guide groove 84 whereby it is possible to smoothly tilt the opening support body 81 about the proximal end portion 81a. In such an operation, it is possible to prevent the guide body 83 and the opening support body 81 from interfering with constitutional members of the prime mover part 2 and, at the same time, it is possible to ensure a wide prime mover part arranging space S shown in FIG. 6.

Further, the guide body 83 is mounted on the reinforcing rib body 82 which reinforces the open-and-close side forming body 31 and hence, it is possible to firmly and simply mount the guide body 83 without additionally providing a mounting bracket or the like whereby the opening support of the open-and-close side forming body 31 by way of the guide body 83 and the opening support body 81 can be surely performed.

In the driving portion 3, as shown in FIG. 1, a steering column 166 is mounted in an erected manner on a front portion of the step portion 165 which is extended in a middle portion of the body frame 1, the dashboard 71 is mounted on an upper end portion of the steering column 166, front end peripheral portions of the dashboard 71 and the steering column 166 are contiguously mounted on the rear end peripheral portion of the dashboard stay 64, the above-mentioned steering post 93 is mounted in an erected manner through the inside of the steering column 166 and the dashboard 71, and a steering handle 169 is mounted on an upper end of the steering handle support shaft 168 which is inserted into the steering post 93.

Further, a driver's seat 170 is arranged at a position behind the steering handle 169, and rear-wheel fenders 171, 171 are arranged at left and right side positions of the driver's seat 170.

Hereinafter, other characterizing structures of this embodiment are explained in conjunction with drawings.

With respect to the fuel tank 74, as shown in FIG. 11 and FIG. 12, mounting members 100, 100 which extend in the vertical direction and project outwardly are integrally formed with a front portion of a side wall thereof, wherein the respective mounting members 100, 100 are mounted on left and right side portions of the partition wall body 75 which faces the respective mounting members 100, 100 right in front of the respective mounting members 100, 100 from behind using the threadedly mounted mounting bolts 102, 102 by way of the mounting brackets 101, 101.

In this manner, since the mounting members 100, 100 which are integrally formed with the fuel tank 74 are mounted on the partition wall body 75 by way of the mounting brackets 101, 101 and hence, it is possible to achieve the reduction of the number of the parts and the reduction of the cost and, at the same time, it is possible to increase the degree of freedom in designing of a shape of the fuel tank.

Figure 13:
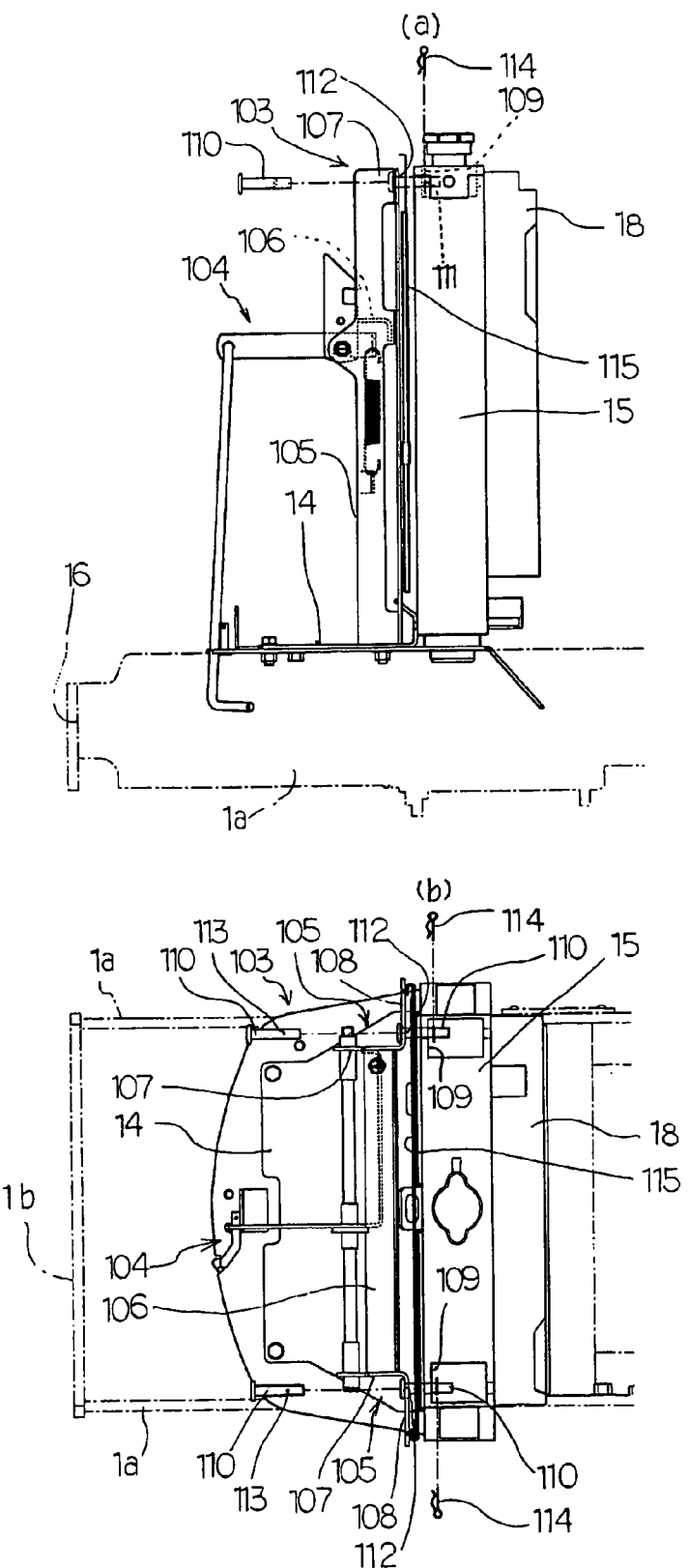
FIG. 13 is a view for explaining the mounting of a radiator.

The radiator 15 is, as shown in FIG. 13(a) which is an explanatory side view and FIG. 13(b) which is an explanatory plan view, mounted on the above-mentioned radiator support body 14, a support frame body 103 is mounted on the radiator support body 14 in an erected manner, and the support frame body 103 fixes an upper portion of the radiator 15 and supports an open-and-close mechanism 104 of the open-and-close forming body 104.

Further, the support frame body 103 is constituted of vertically extending support members 105, 105 which extend in the vertical direction and are mounted in an erected manner on left and right portions of the radiator support body 14, and left and right extending support members 106 which are extended between middle portions of both vertically extending support members 105, 105.

Each vertically extending support member 105, 105 is formed in a L-shape as viewed in a plan view and is constituted of a first forming member 107, 107 which has a side surface thereof directed in the lateral direction and a second forming member 108, 108 which extends outwardly from a rear-end peripheral portion of the first forming member 107, 107 and has a side surface thereof directed in the longitudinal direction. A laterally extending support member 106 which extends in the lateral direction is extended between the first forming members 107, 107 which face each other in the lateral direction, and fixing members 109, 109 which are mounted on left and right upper end portions of the radiator 15 and second forming members 108, 108 which face each other in the longitudinal direction are fixed using a fixing pin 110, 110 which has an axis thereof directed in the longitudinal direction. Numeral 15 indicates a dust preventing meshed body.

Here, in upper portions of the fixing members 109, 109 and the second forming members 108, 108, pin insertion holes 111, 111, 112, 112 which are aligned with each other in the longitudinal direction respectively are formed, fixing pins 110, 110 are inserted into the pin insertion holes 111, 111, 112, 112 which are aligned in the longitudinal direction from a front side, and removal preventing pins 114, 114 are inserted into pin-removal-preventing insertion holes 113, 113 which are formed in distal end portions of the respective fixing pins 110, 110 in a transversely penetrating state thus fixing the radiator 15.

In this manner, the radiator 15 is fixed by inserting the fixing pins 110, 110 into the insertion holes 111, 111, 112, 112 from the front side and hence, it is possible to easily perform the assembling operation of the radiator 15.

As shown in FIG. 1, a flywheel 116 is interlockingly connected to a drive shaft (not shown in the drawing) of the engine 13, an output shaft 117 is mounted on the flywheel 116 in a state that the output shaft 117 projects rearwardly, a hydrostatic valuable transmission (hereinafter referred to as "HST") 118 is interlockingly connected to a front portion of the transmission part 4, an input shaft 119 is mounted on the HST 118 in a state that the input shaft 119 projects frontwardly from the HST 118, and the input shaft 119 and the above-mentioned output shaft 117 are interlockingly connected with each other by way of a power-transmission shaft 120 of the transmission.

Figure 14:
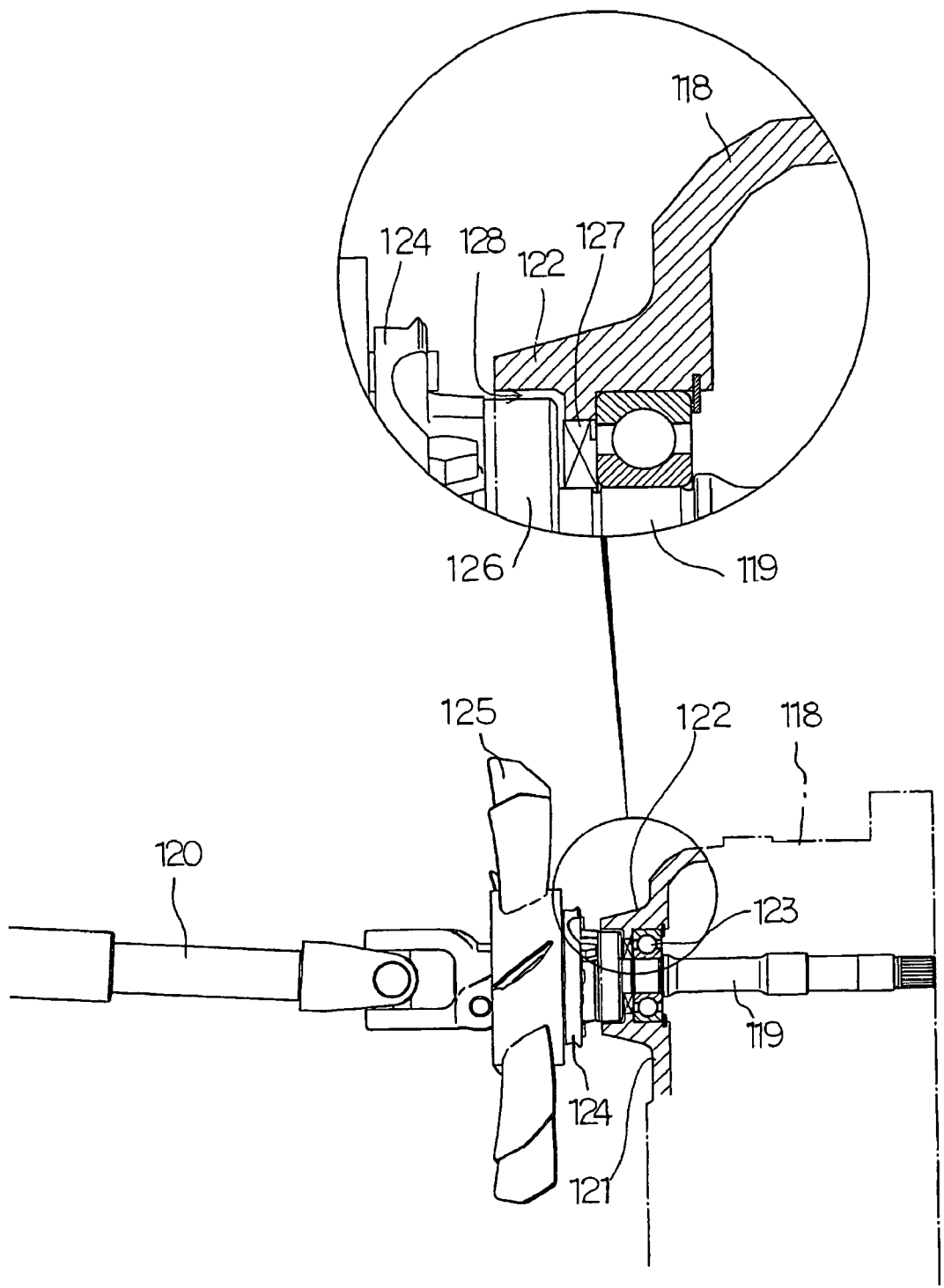
FIG. 14 is an explanatory cross-sectional view showing the structure of a boss portion and a bearing portion of a HST cooling fan.

Further, as also shown in FIG. 14, a cylindrical bearing portion 122 is mounted on a front wall 121 of the HST 118 in a state that the bearing portion 122 projects frontwardly from the front wall 121, and a middle portion of the input shaft 119 is rotatably supported on the bearing portion 122 by way of a bearing 123. Numeral 127 indicates a ring-like sealing material which is fitted on the middle portion of the input shaft 119.

Further, a HST cooling fan 125 is mounted on a portion of the input shaft 119 which projects frontwardly from the HST 118 by way of a boss portion 124, a rear end portion of the boss portion 124 is extended rearwardly thus forming a fit-in portion 126, and the fit-in portion 126 is fitted in the inside of the above-mentioned bearing portion 122.

In such a constitution, between an outer peripheral surface and a rear end surface of the fit-in portion 126 of the boss portion 124 and an inner peripheral surface of the bearing portion 122 and a front end surface of the sealing material 127, a bent labyrinth 128 is formed. Accordingly, it is possible to prevent turf mowed by a mower 10 or the like from being entangled to the sealing material 127 and, at the same time, it is possible to provide such turf-or-the-like entangling preventing structure at a low cost.

As shown in FIG. 1, an output shaft 130 projects frontwardly from a lower portion of the front wall of the transmission part 4, an input shaft 131 projects rearwardly from a center portion of the rear wall of the front axle case 5, and the input shaft 131 and the above-mentioned output shaft 130 are interlockingly connected with each other by way of a front axle power-transmission shaft 132 thus allowing the tractor to perform the four-wheel driving of the front and rear wheels 6, 6, 8, 8.

Figure 15:
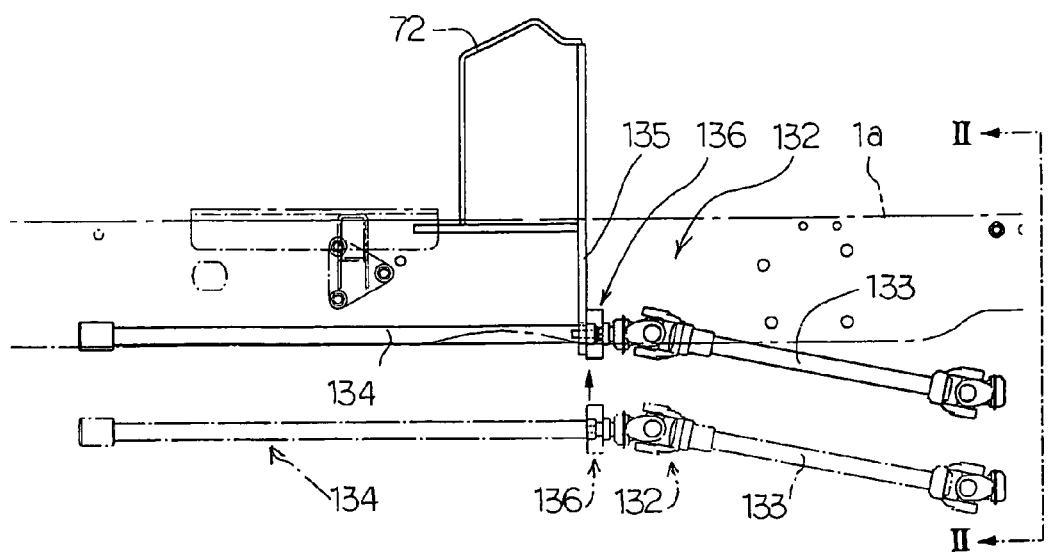
FIG. 15 is a side view for explaining the mounting of a middle portion of a front-axle power-transmitting shaft.
Figure 16:
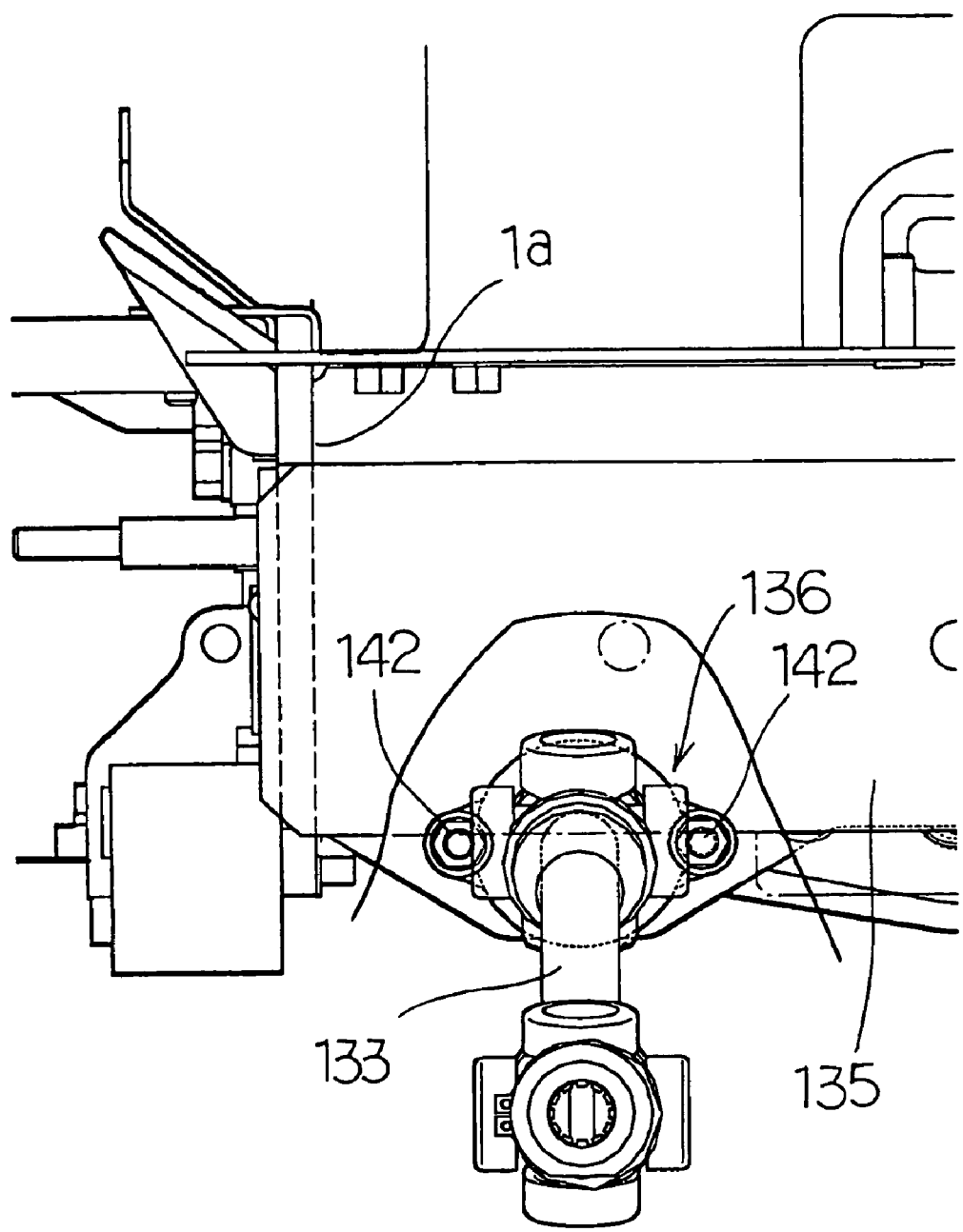
FIG. 16 is a view as viewed from a line II-II in FIG. 15.
Figure 17:
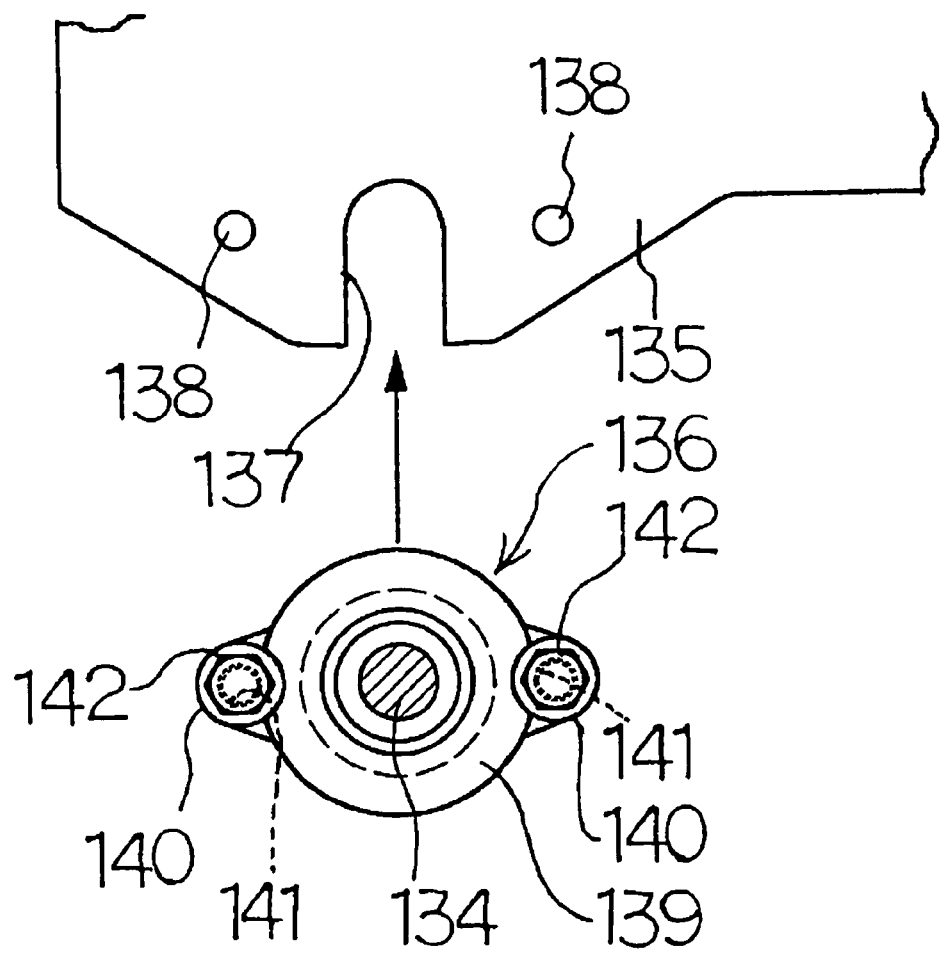
FIG. 17 is a front view for explaining the mounting of a middle portion of a front-axle power-transmitting shaft.

FIG. 15 to FIG. 17 show the middle-portion support structure as another embodiment of the above-mentioned front axle power-transmission shaft 132. The front axle power-transmission shaft 132 is constituted of a front-half forming shaft 133 and a rear-half forming shaft 134, a support wall body 135 which extends in the lateral direction is extended as a longitudinal partition between the middle portions of the pair of left and right longitudinally extending members 1a, 1a, and a front portion of the rear-half forming shaft 134 is supported on the support wall body 135 by way of the shaft support body 136.

Further, in a right portion of the support wall body 135, a cutout groove 137 which opens downwardly and in the longitudinal direction is formed, while a pair of left and right bolt holes 138, 138 are formed in portions of the support wall body 135 positioned on left and right sides of the cutout groove 137 in the longitudinally penetrating manner.

Further, the shaft support body 136 includes a ring-like shaft support member 139 which incorporates a bearing therein, and a pair of left and right lugs 140, 140 which are mounted on left and right side portions of a peripheral surface of the shaft support member 139 and project outwardly. Bolt insertion holes 141, 141 are formed in the respective lugs 140, 140 in the longitudinally penetrating manner, while a front portion of the rear-half forming shaft 134 penetrates the inside of the shaft support member 139.

Accordingly, in mounting the front axle power-transmission shaft 132, first of all, by arranging the front axle power-transmission shaft 132 as indicated by a chained line in FIG. 15 and by moving the front axle power-transmission shaft 132 in such a state upwardly as indicated by a solid line in FIG. 15, a front portion of the rear-half forming shaft 134 of the front axle power transmission shaft 132 is fitted in the cutout groove 137 formed in the support wall body 135 from below.

Subsequently, the shaft support body 136 is brought into contact with a front surface of the support wall body 135, the bolt insertion holes 141, 141 which are formed on the lugs 140, 140 of the shaft support body 136 are aligned with the bolt holes 138, 138 formed in the support wall body 135, and the mounting bolts 142, 142 which have axes thereof directed in the longitudinal direction are threadedly mounted in these aligned holes 141, 141, 138, 138 from a front side.

In this manner, the shaft support body 136 is mounted by threadedly mounting the mounting bolts 142, 142 from the front side and hence, the fastening operation of the respective mounting bolts 142, 142 is facilitated thus enhancing the efficiency of the mounting operation of the shaft support body 136.

Figure 18:
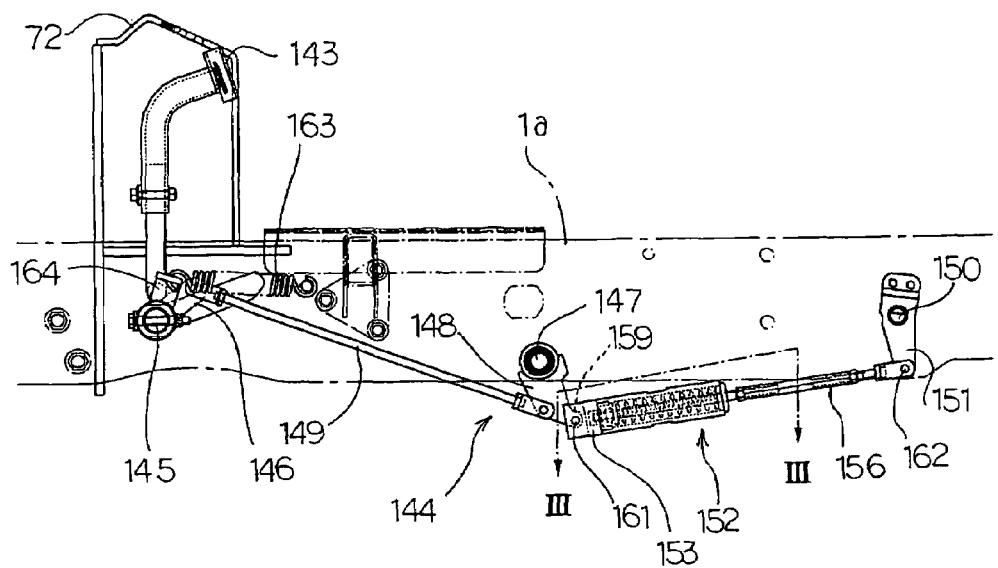
FIG. 18 is a side view of a brake interlocking mechanism.

FIG. 18 is a side view of a brake interlocking mechanism 144 which is interposed between a brake pedal 143 which is arranged on the left downward side of the driving portion 3 and a brake device (not shown in the drawing) mounted on the transmission part 4.

Further, the brake interlocking mechanism 144 is constituted as follows. A brake pedal support shaft 145 which supports the brake pedal 143 is extended between middle portions of the pair of left and right longitudinally extending members 1a, 1a, an interlocking arm 146 is coaxially mounted on a left portion of the brake pedal support shaft 145, a connecting rod 149 is interposed between the interlocking arm 146 and an intermediate arm 148 which is mounted on the left longitudinally extending member 1a by way of an intermediate arm support shaft 147 at a position behind the interlocking arm 146, and a buffer 152 for restricting an overload is interposed between the intermediate arm 148 and a rear arm 151 which is mounted on the left longitudinally extending member 1a by way of a rear arm support shaft 150 at a position behind the intermediate arm 148.

Figure 19:
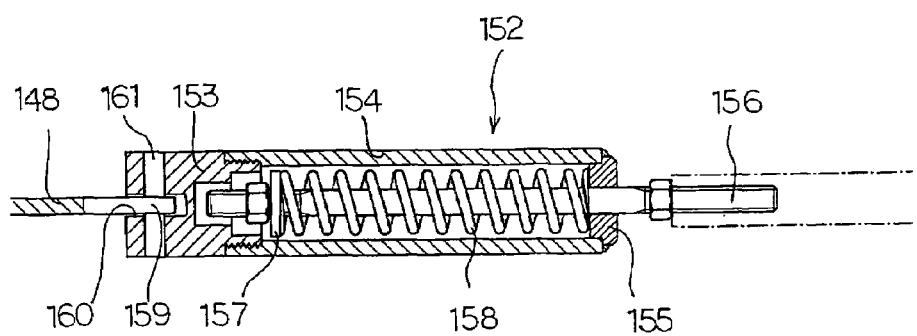
FIG. 19 is an enlarged cross-sectional view as viewed from a line III-III in FIG. 18.

The buffer 152 is, as also shown in FIG. 19, constituted of a front connecting member 153, a cylindrical member 154 which has a front end portion thereof connected to the front connecting member 153 and extends rearwardly, a ring-like slide rod support member 155 which is mounted on a rear end portion of the cylindrical member 154, a slide rod 156 which has a front half portion thereof inserted in the cylindrical member 154 by way of the slide rod support member 155, and a compression spring 158 which is wound around an outer peripheral surface of the front half portion of the slide rod 156 between a stopper member 157 which is mounted on a front end portion of the slide rod 156 and the slide rod support member 155.

Further, a notched groove 160 which allows a connection projecting member 159 formed on a distal end portion of the intermediate arm 148 to be fitted therein is formed in a center portion of the front connecting member 153, the connection projecting member 159 is fitted into the notched groove 160, and a transverse connecting pin 161 which traverses in the lateral direction is formed in the front connecting member 153 in a penetrating manner thus pivotally connecting the connection projecting member 159 to a middle portion of the transverse connecting pin 161.

Further, the slide rod 156 has a rear end portion thereof connected to the rear arm 151 by way of a connecting pin 162. Numeral 163 indicates a neutral restoring tension spring, and numeral 164 indicates a spring connecting arm.

Due to such a constitution, when an operator performs a strong step-in manipulation of the brake pedal 143 and an excessive rotational force is transmitted to the buffer 152 through a transmission path of the brake pedal support shaft 145→the interlocking arm 146→the connecting rod 149→the intermediate arm 148→the buffer body 152, the compression spring 158 mounted in the buffer 152 elastically absorbs the excessive rotational force and hence, the attenuated rotational force is transmitted to the rear arm 151 from the slide rod 156 mounted in the buffer 152.

Here, with respect to the buffer 152, the notched groove 160 is formed in the front connecting member 153, the connection projecting member 159 which is formed on the distal end portion of the intermediate arm 148 is fitted in the notched groove 160, and the connection projecting member 159 is pivotally connected by way of the transverse connecting pin 161 and hence, it is possible to reliably connect the buffer 152 and the intermediate arm 148 while reducing the number of parts.

Figure 20:
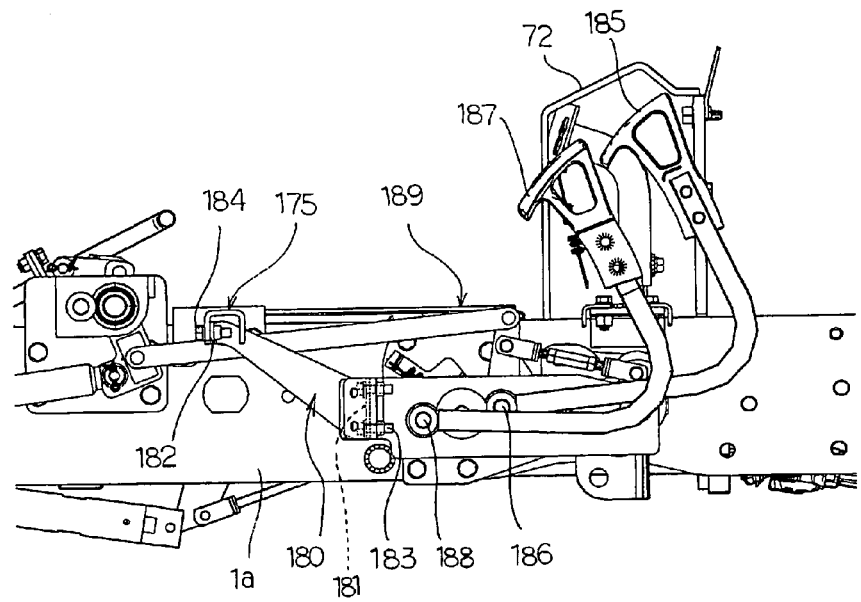
FIG. 20 is a side view showing the reinforcement structure of a step-portion stay.
Figure 21:
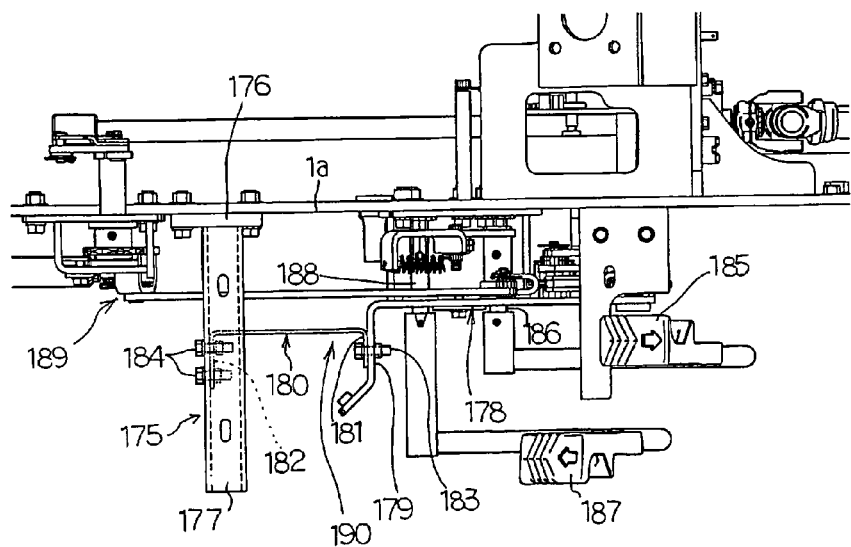
FIG. 21 is a plan view showing the reinforcement structure of the step portion stay.

FIG. 20 and FIG. 21 show the reinforcing structure of a step-portion stay 175 which is mounted on a middle portion of an outer surface of the right longitudinally extending member 1a.

Further, the step-portion stay 175 has a proximal end portion 176 thereof mounted on the middle portion of the outer surface of the longitudinally extending member 1a and, at the same time, has a distal end portion 177 thereof extended outwardly.

Further, at a position right in front of the step-portion stay 175, a pedal-support-shaft stay 178 is mounted on the middle portion of the outer surface of the right longitudinally extending member 1a, a connecting member 179 which is arranged substantially parallel to the above-mentioned step-stay 175 is formed on a rear portion of the pedal-support-stay 178, and a bridging body 180 which extends in the longitudinal direction substantially parallel to the longitudinally extending member 1a is interposed between the connecting member 179 and the middle portion of the step-portion stay 175. Numerals 181, 182 indicate connecting members, numeral 183, 184 indicate connecting bolts, numeral 185 indicates an advancing acceleration pedal, numeral 186 indicates an advancing acceleration pedal support shaft, numeral 187 indicates a retracting acceleration pedal, numeral 188 indicates a retracting acceleration pedal support shaft, numeral 189 indicates an advancing/retracting acceleration interlocking mechanism.

In this manner, a frame-like body 190 having a frame shape as viewed in a plan view is constituted of the bridging body 180, the pedal-support-shaft stay 178, the longitudinally extending member 1a and the step-portion stay 175 and hence, it is possible to increase the strength of the step-portion stay 175 using the frame body 190.

INDUSTRIAL APPLICABILITY (1) According to the present invention described in claim 1, in the tractor in which the prime mover part is mounted on the front portion of the body frame and the prime mover part is covered with the hood, the hood is split into the fixed-side forming body which is fixed to the body frame and the open-and-close side forming body which can open/close the upper surface of the fixed-side forming body, and the fixed-side forming body is split into the left half forming member and a right half forming member, and the connecting support body is formed on the front portion of the body frame in an upwardly raised state and, front-end abutting portions of left-and-right-side half forming members are connected and fixed to the connecting support body using the connecting body in a state that the front-end abutting portions are sandwiched between the connecting support body and the connecting body.

In this manner, by dividing the fixed-side forming body into the two-split structure, the number of parts can be decreased thus lowering the manufacturing cost. Further, by fixing the front-end abutting portions of left-and-right-side half forming members to the connecting support body which is formed on the front portion of the body frame in an upwardly raised state using the connecting body in a state that the front-end abutting portions are sandwiched between the connecting support body and the connecting body, time and efforts for the assembling operation can be largely reduced.

(2) According to the present invention described in claim 2, inwardly pulling surface portions are respectively formed on front end portions of the left and right half forming members, inwardly pulling guide surface portions are formed on left and right side peripheral portions of the connecting support body, the inwardly pulling surface portions of the left and right half forming members are guided in the inwardly pulling direction along both inwardly pulling guide surface portions, and front-end abutting portions of both left and right half forming members are allowed to abut each other.

In this manner, by guiding the inwardly pulling surface portions of the left and right half forming members in the inwardly pulling direction along both inwardly pulling guide surface portions which are formed on front end portions of the left and right half forming members, it is possible to allow the front-end abutting portions of both left and right half forming members to abut each other and hence, it is possible to easily and surely bring both front-end abutting portions into contact with each other.

Accordingly, it is possible to largely reduce time and efforts for assembling operation and, at the same time, it is possible to enhance the assembling accuracy.

(3) According to claim 3, the connecting bolt which is directed rearwardly from the connecting body is mounted on the connecting body in a projecting manner, the connecting bolt is inserted into a bolt insertion hole formed in the connecting support body, the fastening nut is threadedly engaged with a distal end portion of the connecting bolt, wherein due to the fastening manipulation of the fastening nut, the connecting body and the connecting support body are made to approach each other thus clamping the front end abutting portions of the left and right half forming members in the longitudinal direction. Further, by guiding the inwardly pulling surface portions of the left and right half forming members in the inwardly pulling direction along inwardly pulling guide surface portions which are formed on the left and right peripheral portions of the connecting support body, front-end abutting portions of both left and right half forming members are allowed to abut each other.

In this manner, due to the fastening manipulation of the fastening nut, the connecting body and the connecting support body are made to approach each other thus clamping the front end abutting portions of the left and right half forming members in the longitudinal direction. Further, by guiding the inwardly pulling surface portions of the left and right half forming members in the inwardly pulling direction along inwardly pulling guide surface portions which are formed on the left and right peripheral portions of the connecting support body, front-end abutting portions of both left and right half forming members are allowed to abut each other and hence, the assembling operation can be performed easily and rapidly. Also from this aspect, it is possible to largely reduce time and efforts for assembling operation and, at the same time, it is possible to enhance the assembling accuracy.

The invention claimed is:

1. A tractor in which a prime mover part is mounted on a front portion of a body frame and the prime mover part is covered with a hood, wherein the hood is split into a fixed-side forming body which is fixed to the body frame and an open-and-close side forming body which can open/close an upper surface of the fixed-side forming body, and the fixed-side forming body is split into a left half forming member and a right half forming member, and a connecting support body is formed on the front portion of the body frame in an upwardly raised state and, front-end abutting portions of left and right half forming members are connected and fixed to the connecting support body using a connecting body in a state that the front-end abutting portions are sandwiched between the connecting support body and the connecting body.

2. A tractor according to claim 1, wherein inwardly pulling surface portions are respectively formed on front end portions of the left and right half forming members, inwardly pulling guide surface portions are formed on left and right side peripheral portions of the connecting support body, the inwardly pulling surface portions of the left and right half forming members are guided in the inwardly pulling direction along both inwardly pulling guide surface portions thus allowing front-end abutting portions of both left and right half forming members to abut each other.

3. A tractor according to claim 1, wherein a connecting bolt which is directed rearwardly from the connecting body is mounted on the connecting body in a projecting manner, the connecting bolt is inserted into a bolt insertion hole formed in the connecting support body, a fastening nut is threadedly engaged with a distal end portion of the connecting bolt, wherein due to the fastening manipulation of the fastening nut, the connecting body and the connecting support body are made to approach each other thus clamping the front end abutting portions of the left and right half forming members in the longitudinal direction. Further, by guiding the inwardly pulling surface portions of the left and right half forming members in the inwardly pulling direction along inwardly pulling guide surface portions which are respectively formed on the left and right peripheral portions of the connecting support body thus allowing front-end abutting portions of both left and right half forming members to abut each other.

* * * * *